(12) United States Patent
Powell et al.

(10) Patent No.: US 9,223,767 B1
(45) Date of Patent: Dec. 29, 2015

(54) UNIFIED GRAPHICAL USER INTERFACE FOR DISPLAYING A PLAN OF OPERATIONS IN A DATACENTER

(71) Applicant: VMware, Inc., Palo Alto, CA (US)

(72) Inventors: John Powell, Scotts Valley, CA (US); Patrick Devine, Palo Alto, CA (US); Mustafa Jamil, Fremont, CA (US); Daniel Hiltgen, Los Altos, CA (US); Timothy Stack, San Mateo, CA (US); Saleem Abdulrasool, Mountain View, CA (US); Moshe Zadka, San Mateo, CA (US); Kshitij Padalkar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/318,611

(22) Filed: Jun. 28, 2014

(51) Int. Cl.
| | | |
|---|---|---|
| G06F 9/44 | (2006.01) | |
| G06F 17/22 | (2006.01) | |
| G06F 3/0484 | (2013.01) | |
| H04L 29/08 | (2006.01) | |
| G06F 17/30 | (2006.01) | |

(52) U.S. Cl.
CPC ........ *G06F 17/2247* (2013.01); *G06F 3/04842* (2013.01); *G06F 17/30345* (2013.01); *H04L 67/02* (2013.01)

(58) Field of Classification Search
USPC .................. 717/105–109, 120–121, 173–174
IPC ............... G06F 8/70,8/71, 17/30286, 17/30943, G06F 8/20, 8/34, 8/38
See application file for complete search history.

(56) References Cited

U.S. PATENT DOCUMENTS

| | | | |
|---|---|---|---|
| 5,867,711 A | 2/1999 | Subramanian et al. | |
| 6,077,313 A | 6/2000 | Ruf | |
| 6,385,766 B1 * | 5/2002 | Doran et al. | 717/174 |
| 7,096,459 B2 * | 8/2006 | Keller et al. | 717/124 |
| 7,240,325 B2 * | 7/2007 | Keller | 717/104 |
| 7,480,900 B1 | 1/2009 | Zhou et al. | |
| 7,493,594 B2 * | 2/2009 | Shenfield et al. | 717/107 |
| 7,496,912 B2 * | 2/2009 | Keller et al. | 717/174 |
| 7,823,121 B1 * | 10/2010 | Zarrinkoub et al. | 717/105 |
| 7,895,572 B2 * | 2/2011 | Stienhans | 717/120 |
| 7,984,417 B2 * | 7/2011 | Ben-Zvi et al. | 717/106 |
| 7,996,814 B1 * | 8/2011 | Qureshi et al. | 717/120 |
| 8,006,224 B2 * | 8/2011 | Bateman et al. | 717/104 |
| 8,086,995 B2 * | 12/2011 | Luo et al. | 717/105 |
| 8,108,836 B1 * | 1/2012 | Campbell et al. | 717/120 |
| 8,145,677 B2 * | 3/2012 | Al-Shameri | 707/802 |
| 8,166,455 B2 * | 4/2012 | Voss | 717/106 |
| 8,307,331 B2 * | 11/2012 | Warila et al. | 717/109 |

(Continued)

OTHER PUBLICATIONS

Reijonen et al, "Patterns for Configuration and Update Management in Distributed Machine Control Systems", ACM, pp. 1-6, 2010.*

(Continued)

*Primary Examiner* — Anil Khatri

(57) ABSTRACT

In a computer-implemented method for a unified graphical user interface for displaying a plan of operations in a datacenter metadata is accessed from a plurality of disparate software bundles for updating targets in a datacenter. A unified visualization of a plan of operations on the targets is displayed via a unified graphical user interface based on the accessed metadata, wherein the unified graphical user interface displays the plan of operations with a common look and feel.

18 Claims, 18 Drawing Sheets

(56) References Cited

U.S. PATENT DOCUMENTS

| | | | |
|---|---|---|---|
| 8,341,595 B2* | 12/2012 | Arner et al. | 717/109 |
| 8,381,174 B2* | 2/2013 | Rogers | 717/105 |
| 8,655,998 B1* | 2/2014 | Raju et al. | 709/223 |
| 8,671,387 B2* | 3/2014 | Quine | 717/105 |
| 8,752,015 B2* | 6/2014 | Basak et al. | 717/121 |
| 8,972,872 B2* | 3/2015 | Labrou et al. | 715/762 |
| 2004/0039801 A9 | 2/2004 | Srinivasan et al. | |
| 2006/0250981 A1 | 11/2006 | Li et al. | |
| 2007/0038983 A1 | 2/2007 | Stienhans | |
| 2007/0039001 A1 | 2/2007 | Briccarello et al. | |
| 2007/0083716 A1 | 4/2007 | Rajamony et al. | |
| 2007/0083926 A1 | 4/2007 | Burkhart et al. | |
| 2008/0208827 A1 | 8/2008 | Adir et al. | |
| 2009/0213128 A1 | 8/2009 | Chen et al. | |
| 2010/0180255 A1 | 7/2010 | Chung et al. | |
| 2010/0275213 A1 | 10/2010 | Sakai et al. | |
| 2010/0293483 A1 | 11/2010 | Austin et al. | |
| 2011/0179252 A1 | 7/2011 | Master et al. | |
| 2011/0202548 A1 | 8/2011 | Nakamoto et al. | |
| 2013/0110675 A1 | 5/2013 | Bouw et al. | |
| 2013/0145349 A1 | 6/2013 | Basak et al. | |
| 2013/0185807 A1 | 7/2013 | Rodriguez et al. | |
| 2013/0191345 A1 | 7/2013 | Banerjee et al. | |
| 2013/0238468 A1 | 9/2013 | Pangrazio et al. | |
| 2013/0282748 A1 | 10/2013 | Liensberger et al. | |

OTHER PUBLICATIONS

Samuel et al, "Survivable Key Compromise in Software Update Systems", ACM, pp. 61-72, 2010.*

Kramer et al, "Using Document-Oriented GUIs in Dynamic Software Product Lines", ACM, pp. 85-94, 2013.*

Vieira et al, "Automation of GUI Testing Using a Model-driven Approach", ACM, pp. 9-14, 2006.*

* cited by examiner

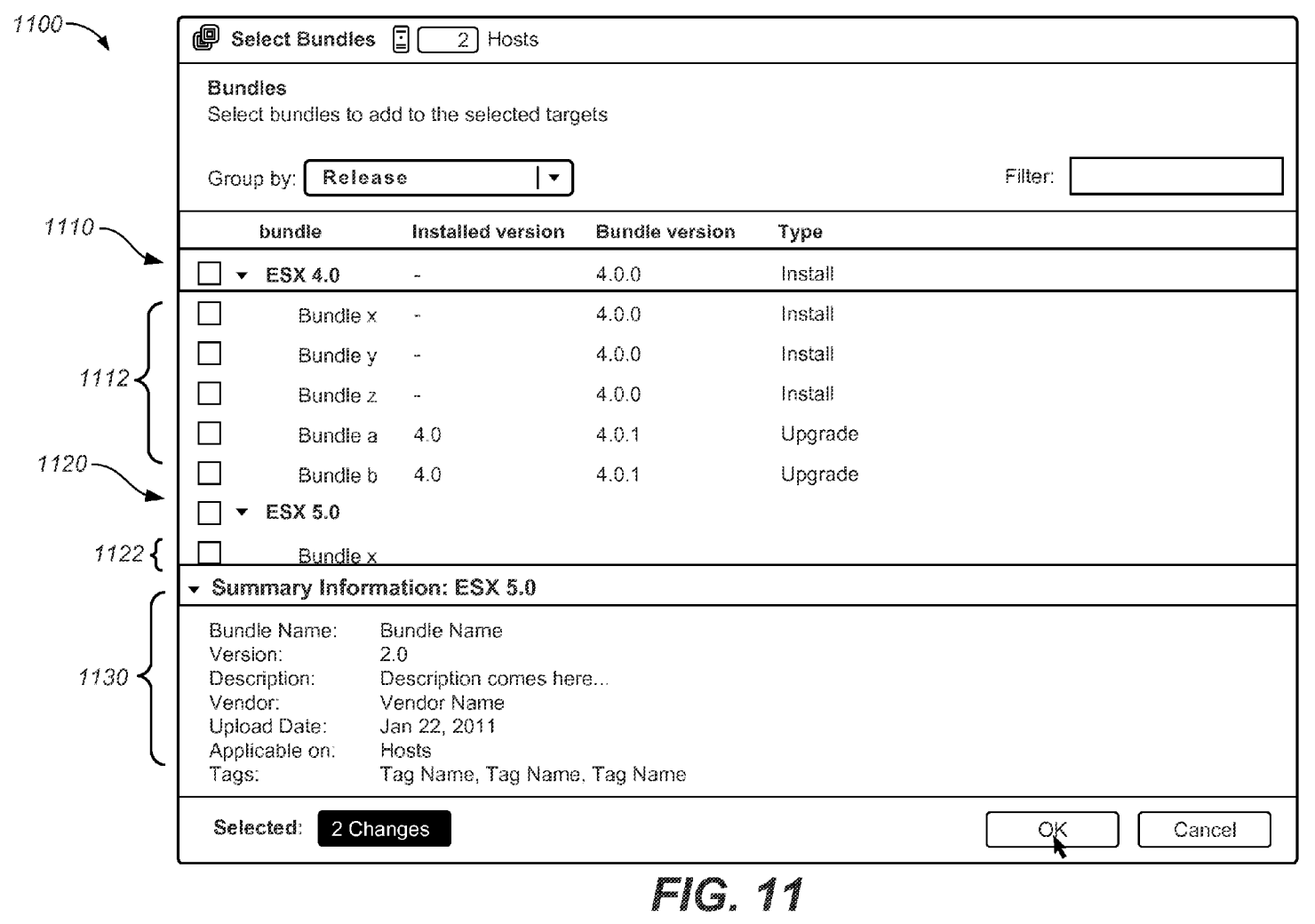

| Select Bundles | 2 Hosts | | | |
|---|---|---|---|---|
| Bundles | | | | |
| Select bundles to add to the selected targets | | | | |
| Group by: Release ▼ | | | | Filter: |
| | bundle | Installed version | Bundle version | Type |
| ☐ ▶ | ESX 4.0 | - | 4.0.0 | Install |
| ☐ | Bundle x | - | 4.0.0 | Install |
| ☐ | Bundle y | - | 4.0.0 | Install |
| ☐ | Bundle z | - | 4.0.0 | Install |
| ☐ | Bundle a | 4.0 | 4.0.1 | Upgrade |
| ☐ | Bundle b | 4.0 | 4.0.1 | Upgrade |
| ☐ ▶ | ESX 5.0 | | | |
| ☐ | Bundle x | | | |

▼ Summary Information: ESX 5.0

Bundle Name: Bundle Name
Version: 2.0
Description: Description comes here...
Vendor: Vendor Name
Upload Date: Jan 22, 2011
Applicable on: Hosts
Tags: Tag Name, Tag Name, Tag Name Selected: 2 Changes

[OK] [Cancel]

*FIG. 11*

UNIFIED GRAPHICAL USER INTERFACE FOR DISPLAYING A PLAN OF OPERATIONS IN A DATACENTER

RELATED APPLICATIONS

This application is related to co-pending U.S. application Ser. No. 14/318,607, filed on Jun. 28, 2014, entitled "UNIFIED VISUALIZATION OF A PLAN OF OPERATIONS IN A DATACENTER," by Cameron et al., and assigned to the assignee of the present application.

This application is related to co-pending U.S. application Ser. No. 14/318,614, filed on Jun. 28, 2014, entitled "SELECTION OF RELEVANT SOFTWARE BUNDLES," by Cameron et al., and assigned to the assignee of the present application.

This application is related to co-pending U.S. application Ser. No. 14/318,615, filed on Jun. 28, 2014, entitled "SCHEDULING A PLAN OF OPERATIONS IN A DATACENTER," by Powell et al., and assigned to the assignee of the present application.

This application is related to co-pending U.S. application Ser. No. 14/318,616, filed on Jun. 28, 2014, entitled "DEDUPLICATION OF END USER LICENSE AGREEMENTS," by John Powell, and assigned to the assignee of the present application.

BACKGROUND

Datacenters include thousands of physical and software components. As a result, it can be very complex and difficult to properly manage and maintain the datacenter and its components such that they function as desired. Moreover, many of the components are dependent on one another. For example, if one component is modified or changed, dependent components may also need to be modified or changed such that the datacenter and its components function properly and efficiently. The many layers of dependency add to the complexity and difficulty of properly managing and maintain the datacenter and its components.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 11 depicts a block diagram of a screenshot for selection of software bundles, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Computing System

Figure 1:
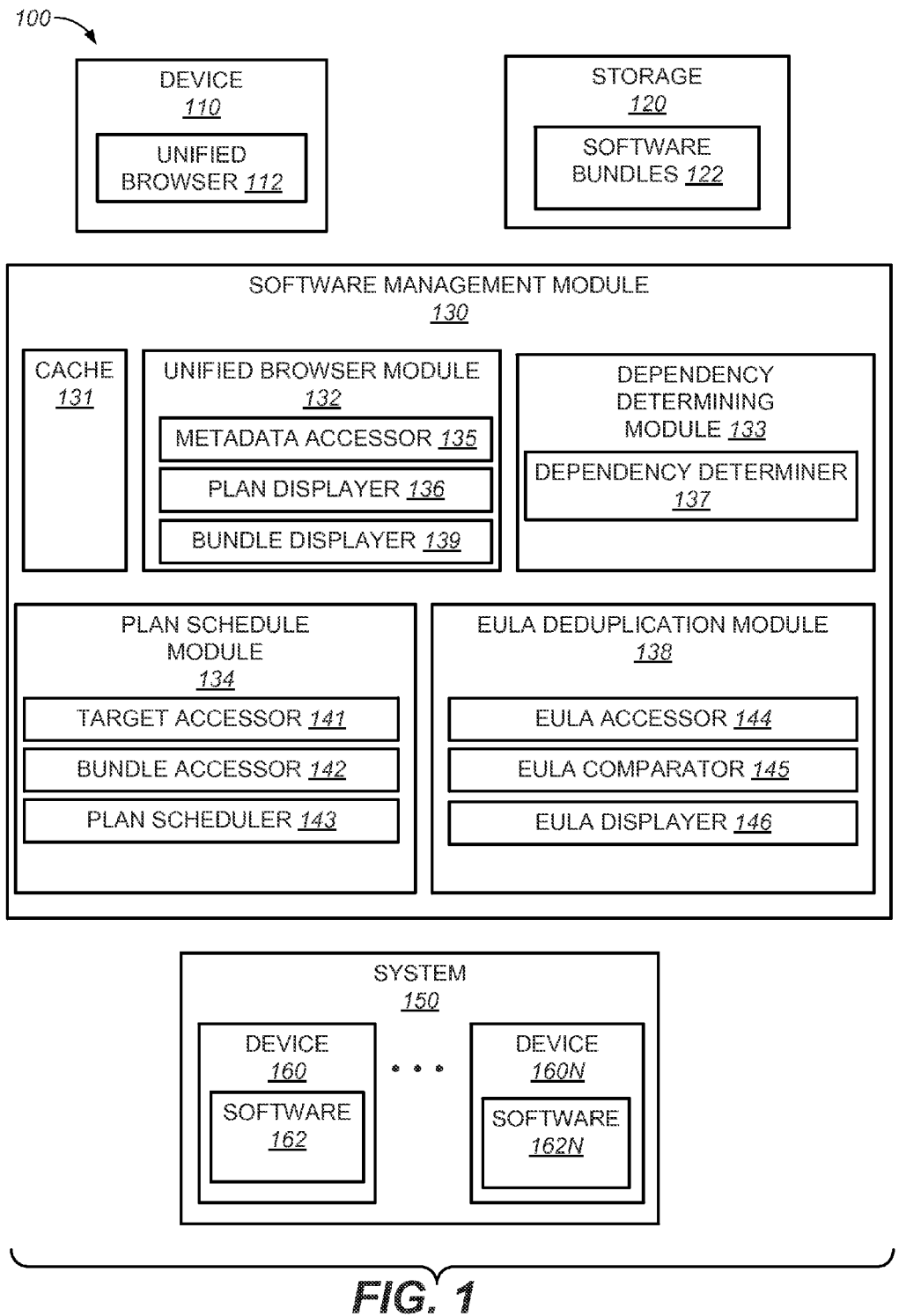
FIG. 1 depicts a block diagram of a computer system, according to various embodiments.

FIG. 1 depicts a block diagram of computing system 100. In general, computing system 100 includes software management module 130 that is configured for, among other things, managing software that is implemented in system 150. Software management can include, but is not limited to, tracking, upgrading, patching, installing of the software implemented in system 150. Moreover, the software management can include, among other things, determining dependencies and interrelationships between various "targets" in system 150, as well as the devices that include such software.

As will be described in further detail below, the software management module accesses software bundles 122 for the software management of system 150. In particular, each of the various software bundles includes metadata and a payload. The metadata includes logic that that facilitates in the tracking, upgrading, patching, and/or installing of the software implemented in system 150.

Additionally, as will also be described in further detail below, the software management provided by software management module 130 is managed by a user via unified browser 112. That is, the disparate software management user interface logic (provided in the disparate software bundles) are presented in a uniform manner on unified browser 112 via unified browser module 134.

In various embodiments, software management module 130 is included in a computer system (e.g., device 110). The computer system includes a processor configured to execute software management module 130 and the various components/modules in software management module 130.

System 150 can be any computing system that includes targets or entities that are enabled to be updated via software management module 130.

System 150, in one embodiment, is a datacenter. The datacenter can be or include a virtual computing environment.

In one embodiment, the datacenter may be a system (e.g., enterprise system) or network that includes a combination of computer hardware and software. The corporation or enterprise utilizes the combination of hardware and software to organize and run its operations.

In various embodiments, the datacenter includes a plurality of devices, such as devices 160-160n. The devices are any number of physical and/or virtual machines. The physical devices, may be, but are not limited to, servers, storage, memory, etc.

The datacenter, in one embodiment, is a corporate computing environment that includes tens of thousands of physical and/or virtual machines. It is understood that a virtual machine is implemented in a virtualized environment that includes one or some combination of physical computing machines. The virtualized environment provides resources, such as storage, memory, servers, CPUs, network switches, etc., that are the underlying hardware infrastructure for the virtual computing environment.

The physical and/or virtual machines include a variety of software (e.g., software 162-162n) or applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual datacenter is implemented on one or some combination of physical machines.

In various embodiments, system 150 (or datacenter) may be a cloud environment, built upon a virtualized environment. System 150 may be located in an Internet connected datacenter or a private cloud computing center coupled with one or more public and/or private networks. System 150, in one embodiment, typically couples with a virtual or physical entity in a computing environment through a network connection which may be a public network connection, private network connection, or some combination thereof. For example, a user may couple via an Internet connection with system 150 by accessing a web page or application presented by system 150 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 12.

During use, the virtual machines perform various workloads. For example, the virtual machines perform the workloads based on executing various applications or software. The virtual machines can perform various workloads separately and/or in combination with one another.

Example of Software Bundles

As described above, system 150 or datacenter includes numerous instances of software (e.g., software 162 through 162n) provided by various parties or entities (e.g., OEMs, manufacturers, vendors, etc.). For example, a host or a virtual machine may include various disparate software applications. Additionally, numerous hosts and/or virtual machines may each include the same software (e.g., data processing software).

The software bundles facilitate in managing (e.g., tracking, upgrading, patching, installing) the software utilized in system 150. The software bundles may be provided by the party (e.g., OEMs, manufacturers, vendors, etc.) that is provides the software in the datacenter or may be provided by another entity.

The software bundles may be stored in storage 120 (or bundle depot). Storage 120 may be a single storage system (e.g., host) or may be distributed.

Typically, each bundle includes metadata and a payload. The metadata includes logic that controls or provides instructions for managing of targets. In various embodiments, the metadata includes probing logic that acts on the "target" to be managed by the software bundle.

More specifically, each software component (or "payload") that may be delivered and installed in the datacenter may be wrapped in a logical package (or "bundle") along with metadata and one or more scripts (action scripts, probe scripts). The payload, the metadata, and the one or more scripts are logically collectively referred to as the bundle and may be stored storage 120 a as a single file, or as separate files.

The payload in a bundle may be any kind of data that may need to be installed in the datacenter. In an embodiment, the payload is software; however, the payload may be data instead of computer instructions. For example a "data" payload may be data that specifies a new database schema to re-configure an existing database, or data use to configure the operation of an application, and so on. In the case of software payloads, the software may be user-level applications, background programs, device drivers, firmware, software patches, and so on. The software may be in any suitable data format, such as binary code, WAR (web application archive) files for Java® applications, OVF (open virtual format) files for virtual appliances that execute on virtual machines, TAR (tape archive) files, and so on. The payload may be platform neutral (e.g., Java® WAR files, and the like). The payload may be specific to a particular component in the datacenter; e.g., firmware specific to a particular version of a disk storage system. A bundle may include multiple payloads and suitable metadata and scripts to support different targets, and so on.

In some embodiments, the metadata in a feature bundle may include any information that may be used to describe the relationship of its payload with other components in the datacenter to facilitate compatibility determinations. For example, the metadata may include a list of compatible versions of the components that the payload is intended to interact with. The metadata may describe required configurations or settings of the components, and so on. As an example, consider a feature bundle containing a device driver X as its payload. The associated metadata may indicate that the device driver may operate with storage devices having firmware versions 2, 3, and 3.2. The metadata may also indicate that the device driver will only work with storage devices having a maximum storage capacity of 500 GB. The metadata may provide conditions or other predicate information specifying how, when, and whether upgrade activities may be performed on a target component, whether a software component may be downgraded to an earlier version, and so on. The metadata is typically created by the author of the bundle. In an embodiment, however, the IT administrator may have access to the metadata in order to add datacenter-specific constraints. For example, the IT administrator may include temporal constraints in the metadata, such as specifying when a target may be taken down. Conditions for when a target can be taken down may be specified in the metadata, and so on.

The feature bundle may include one or more "scripts". These are programs that are separate from the payload and are employed to perform various tasks relating to the payload in the feature bundle, and may be used to maintain the dependency or dependency graph. In some embodiments, the software component management server 100 may define a scripting framework that may be exposed to software vendors to facilitate development of suitable scripts to integrate their software components with the datacenter without having to burden the IT administrators in the datacenter with such tasks. The terms "software vendor" and "vendor" may refer to third party commercial providers of the software, to engineering and support staff employed by the datacenter who might develop and deploy software to the datacenter, and so on; basically, any supplier of software components for deployment in the datacenter may be referred to as a vendor.

One class of scripts is referred to as "action" scripts. Typically, action scripts are provided by the software vendor since the vendor is likely to know precisely what steps and sequence of steps are needed to properly install the payload in a target, which may involve installing a new version of software, upgrading a portion of the software, patching the software, and so on. An action script may be provided to uninstall the payload. Still another action script may be provided to control the target to perform a dry run of the newly installed payload, to configure the target after the installation, and so on.

Another class of scripts is called "probe" scripts. In an embodiment, probe scripts allow a feature bundle to add new node types and instances of those node types as well as edges to the dependency graph, thus extending the data graph's representation of the datacenter to include additional components in the datacenter. For example, suppose a datacenter is configured with storage devices called SANs (storage area network) and that there is presently no representation of SANs in the dependency graph of the datacenter; this situation may arise, for example, if the SANs are newly installed and the dependency graph was not updated. Suppose further that a software upgrade requires knowledge about SANs as an integral part of its dependency calculations. A suitable probe script may be provided to define a new node type in the dependency graph to represent SANs. The probe script may include logic (e.g., executable instructions, script language, etc.) to discover all SAN instances in the datacenter. For each SAN, the probe script may generate as many RDF triples as needed to adequately describe the SAN and its dependency relation with other components in the datacenter, and store those triples via software management module 130.

I. Embodiments of Scheduling a Plan of Operations in a Datacenter

The discussion below will focus on the orchestration and scheduling of a various operations for system 150 or a datacenter. In other words, a work flow or plan is generated for the maintenance of the datacenter. The plan may then be executed. The plan to be generated includes one or more targets in the datacenter. The executed plan will provide maintenance for the targets in the datacenter via software management module 130.

A target, as used herein, is any entity in the datacenter. In general, a target is anything in the datacenter that can be subject to any type of software change or transformation. In other words, a target is any logical, virtual, or physical entity that is associated or controlled by software.

In one example, a target may include any of devices 160-160n, and/or software 162-162n. A target (or entity) can be, but is not limited to, a physical host (e.g., running Windows, Linux, Unix, etc.), firmware on a device that is located on a physical host, a virtual machine, storage device, and the like.

Figure 2:
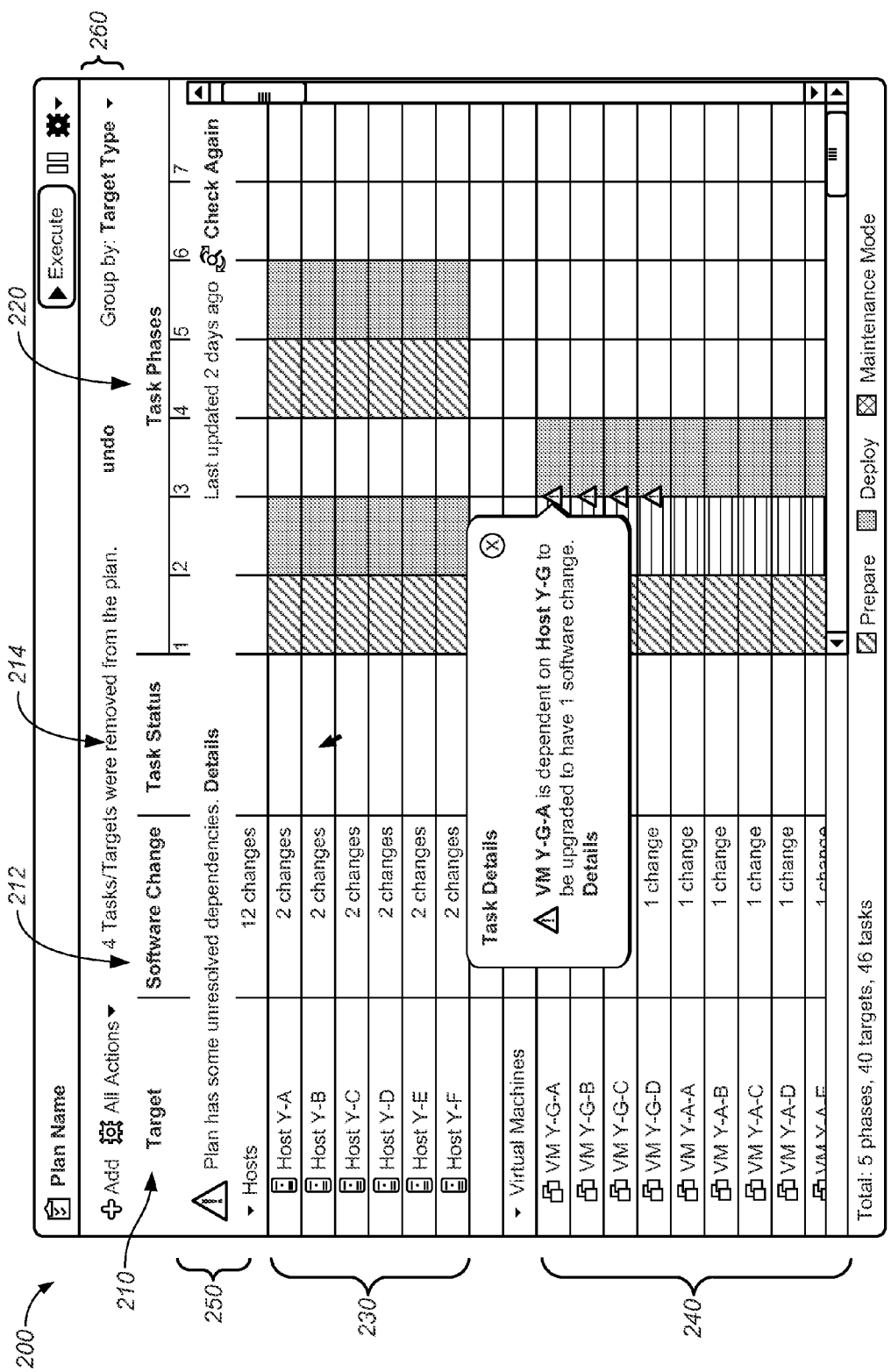
FIG. 2 depicts a block diagram of a screenshot of a plan of operations, according to various embodiments.

FIG. 2 depicts an embodiment of a screenshot of plan 200 for updating software in the datacenter. Plan 200 is generated via plan schedule module 134 of software management module 130.

A plan of operations (e.g., plan 200) may be or be similar to a Gantt chart. A Gantt chart is a type of bar chart that illustrates a project schedule. Gantt charts typically illustrate the start and finish dates/times of the terminal elements and summary elements of a project. Terminal elements and summary elements comprise the work breakdown structure of the project. Additionally, a Gantt charts may show the dependency (i.e. precedence network) relationships between activities.

Plan 200 depicts a column that includes targets 210, a column that includes software change 212, and a column that includes task phases 220.

Targets 210 include hosts in portion 230 and virtual machines in portion 240. It should be appreciated that other targets may be depicted (e.g., firmware, routers, SANs, etc.).

In order to create plan 200 to updated targets in the datacenter, targets are displayed for selection in unified browser 112. For example, targets 210 are displayed for selection by a user (e.g., IT admin) and Host Y-A is selected in portion 230.

When a target is selected, various bundles are displayed to the user in unified browser 112. A user may then select one or more displayed bundles to update the selected target.

In one embodiment, the bundles displayed for selection may be all the software bundles (e.g., software bundles 122) in storage 120. In another embodiment, the bundles displayed are the bundles that apply to the selected target, while bundles that do not apply or are not configured for the selected target are not displayed or "greyed out."

Figure 3A:
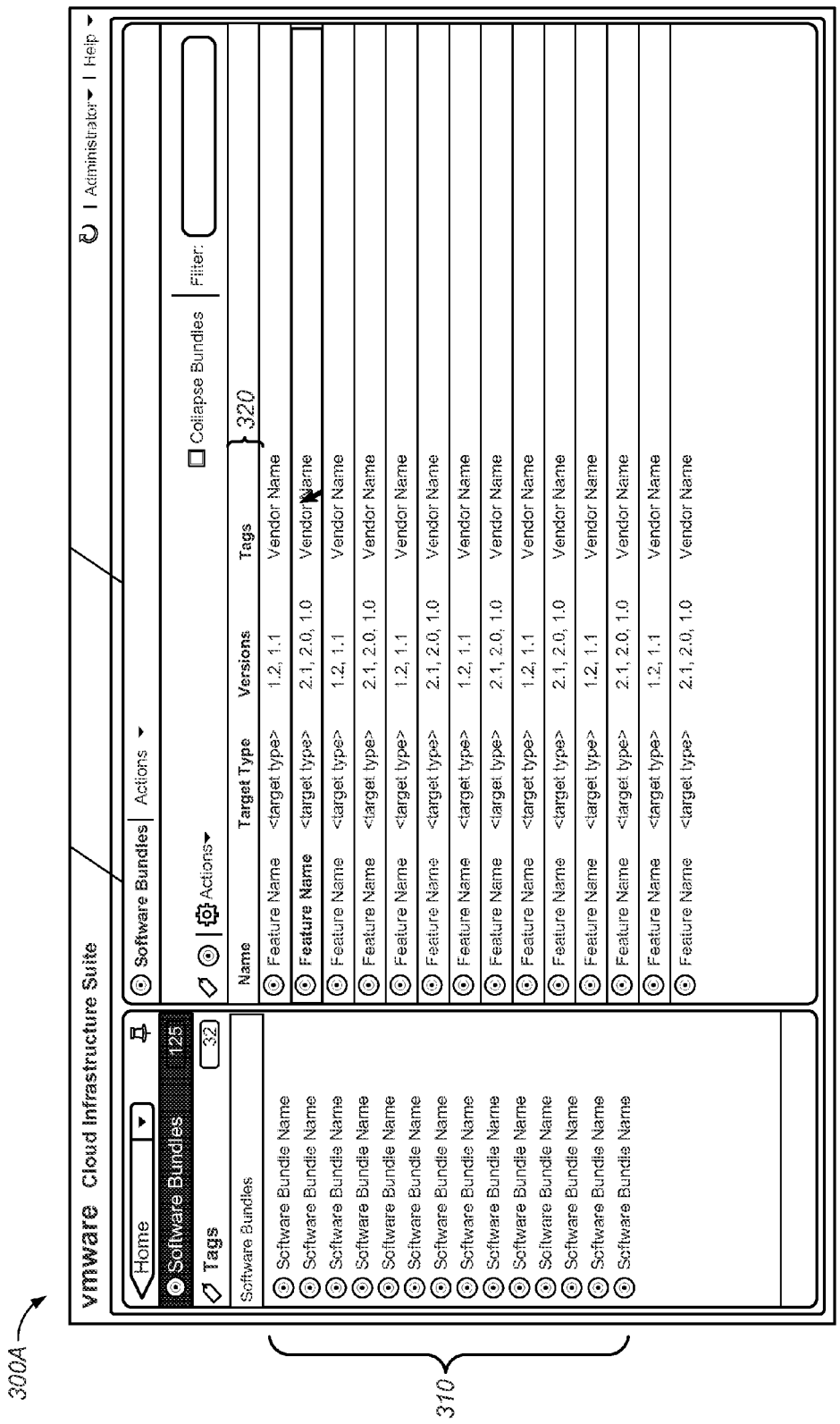
FIG. 3A depicts a block diagram of a list of software bundles, according to various embodiments.
Figure 3B:
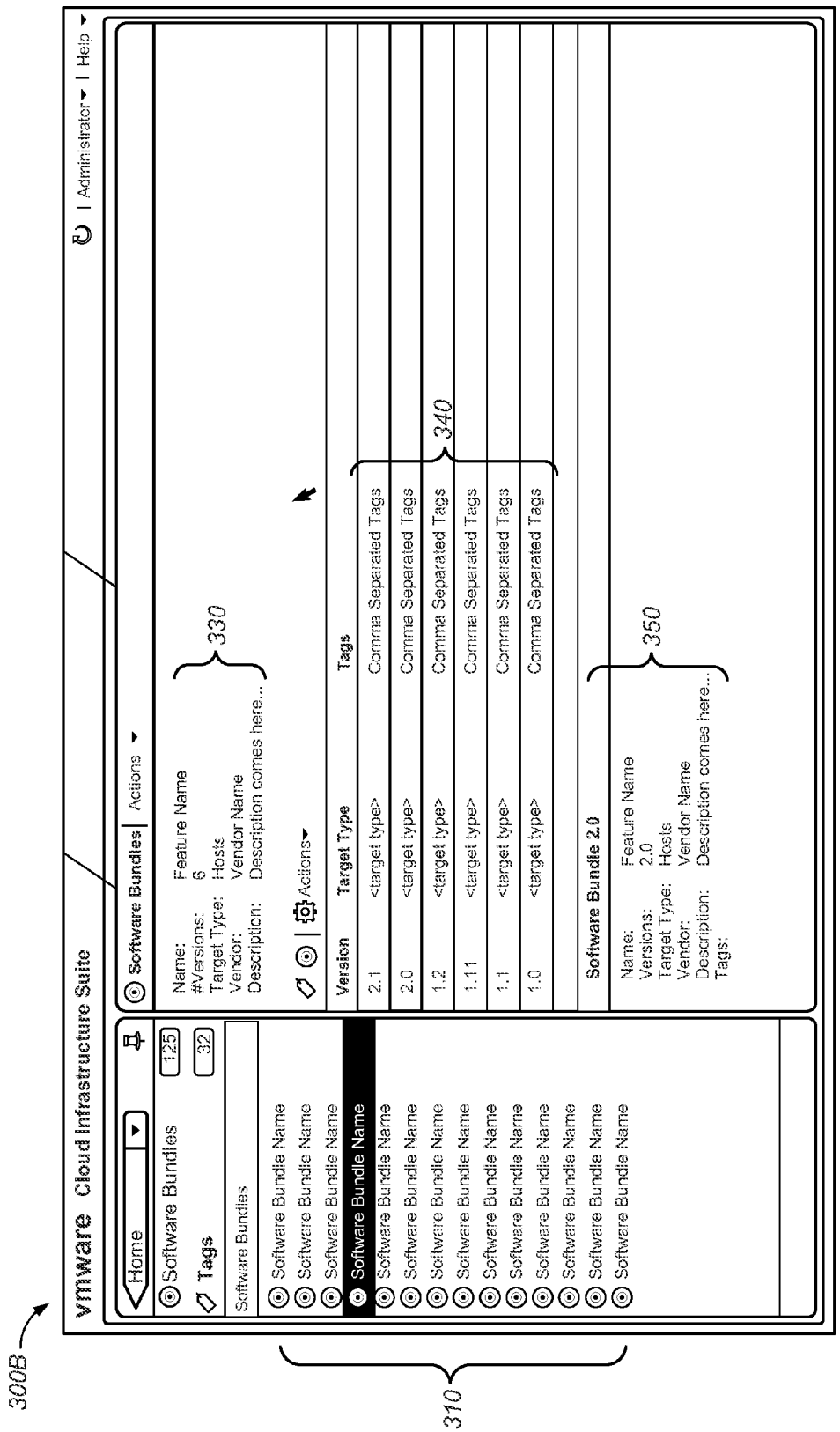
FIG. 3B depicts a block diagram of a screenshot of a list of software bundles, according to various embodiments.

FIGS. 3A and 3B each depict an embodiment of screenshots 300 and 400, respectively, depicting a list of software bundles.

Referring to FIG. 3A, screenshot 300A includes portion 310 that lists various software bundles with their respective names that are able to be selected by a user for updating a selected target.

Additionally, screenshot 300A includes portion 320 that includes a column describing various attributes of the various software bundles. For example, portion 320 includes name, target type, versions and tags (e.g., vendor name). It should be appreciated that portion 320 can include any information associated with a software bundle.

Referring to FIG. 3B, screenshot 300B includes portion 310, as described above, that lists various software bundles with their respective names that are able to be selected by a user for updating a selected target.

Additionally, screenshot 300B includes portion 330 that depicts various attributes of a selected software bundle, such as, name, number of versions, vendor name, and description.

Portion 340 depicts additional attributes of the selected software bundle, such as, version (e.g., version 2.1, 2.0, 1.2, 1.11, 1.1, and 1.0), target type and tags for each of the various software versions in the selected software bundle.

In portion 340, a particular version (e.g., version 2.0) of the software bundle may be selected.

Portion 350 includes various attributes of the software bundle version that is selected in portion 340, such as, name, version, target type (e.g., hosts), vendor name, and tags/description.

Referring again to FIGS. 1 and 2, in response to selection of a target and a software bundle, dependency determining module 133 automatically determines any dependency issues with the selected target and the selected software bundle. For example, dependency determining module 133 determines if there are any dependency issues. For example, dependency determining module 133 determines if conflicts exist with respect to the selected target and software bundles for updating the selected target.

In another example, dependency determining module 133 determines what other targets are dependent on the selected target and determines which of the other targets also need to be updated to maintain dependency with the selected target that is to have a software update.

Plan schedule module 134 facilitates in scheduling a plan that includes various tasks. For example, task phases 220 include various tasks and their phases to implement the updating of a target. For example, various task phases are provided for the updating of various hosts in portion 230 and virtual machines in portion 240.

The task phases for the targets to be updated are depicted in sequential order. It should be appreciated that numerous operations may be scheduled for each target. Additionally, a plan, as whole, may include numerous targets and numerous operations are scheduled for each task.

The updating of various targets may be scheduled sequentially or may be scheduled concurrently with one another.

The task phases are provided as "cells" in the task phases 220 portion. Moreover, each cell of the task phases may be user interactive. That is, each cell may be selected. In response to the selection, various types of information associated with the selected task phase are displayed and the user may interact with such information.

For example, a cell may be selected and "task details" may be displayed which may in include dependency information or any other task related information (e.g., time of deployment, etc.).

Various task phases may be controlled or modified by user input. For example, plan schedule module 134 may automatically generate plan 200 that includes various task phases 220 as depicted. For example, task phases 1, 2, 3, 4, 5, 6, and 7 (listed in sequential order) are depicted for various targets, such as for Host Y-A in portion 230. However, a user may desire modify the task phases such that task phase 2 is executed prior to task phase 1. The user may select cell associated with task phase 2 and drag it to the left and drop it prior to task phase 1. As a result, the task associated with the original task phase 2 is now planned prior to the original task associated with task phase 1.

Additionally, the rest of plan 200 may be modified in response to user modification. For example, various dependent targets that are affected by the user modification, as described above, may be automatically modified in order to maintain the proper dependencies.

Plan 200 includes portion 250 that displays a warning associated with dependencies in plan 200. For example, portion 250 indicates a warning that there are unresolved dependencies.

Plan 200 includes portion 260 that enables selection of how targets are displayed in plan 200. For example, the targets can be displayed by target type (e.g., hosts, virtual machines, etc.).

Figure 6:
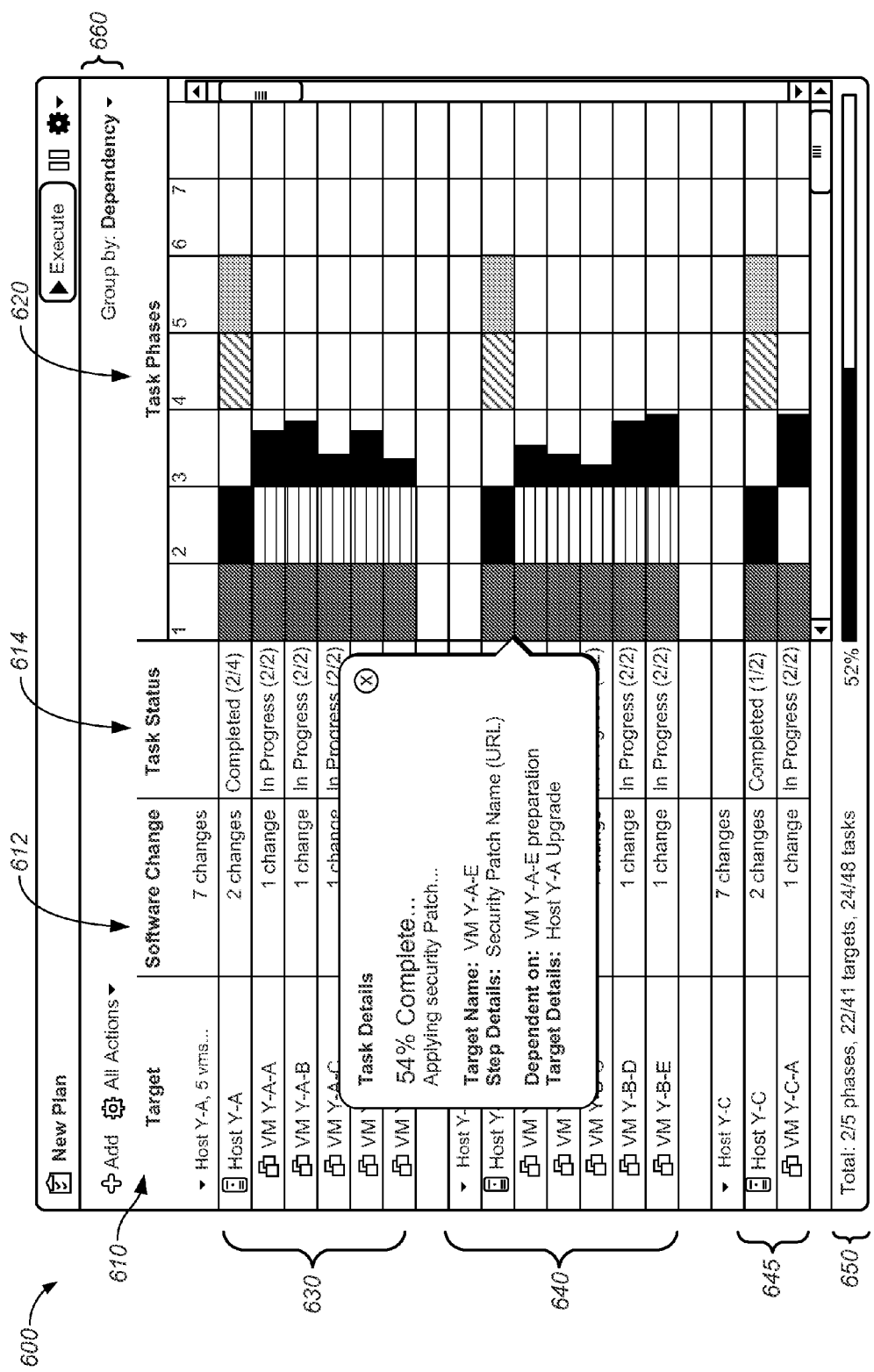
FIG. 6 depicts a block diagram of a screenshot of a plan of operations, according to various embodiments.

In another example the targets can be displayed by dependencies (see FIG. 6). In such an example, a target is displayed (e.g., Host Y-A) and all dependent targets (e.g., virtual machines Y-A-A, Y-A-B, etc.) are displayed directly below (and indented) the listing of the target.

The scheduled plan, such as plan 200, may be executed immediately or may be executed at a subsequent time. More specifically, a plan may be scheduled during open maintenance windows.

In various embodiments, the operations or tasks may be related or may not be related. For example, referring to FIG. 2, operations for Host Y-A and operations for Host Y-B may be related or may not be related.

It should be appreciated that plan 200 is displayed on unified browser 112. That is, the scheduled plan for each target is displayed with a common look and feel (as depicted in FIG. 2). For example, operations are based on selected software bundles. The bundles, as described herein, may oftentimes be from different vendors and therefore are disparate.

Unified browser module 132 accesses the metadata of the disparate software bundles. Based on the accessed disparate software bundles, the unified browser module displays, with a common look and feel, the operations of the plan. For example, referring to FIG. 2, the task plans for each host that includes updating software from disparate software bundles is presented, via unified browser 112, in a similar fashion or with a common look and feel.

Additional details regarding unified browser module 132 and unified browser 112 are provided further below.

Example Methods of Operation

Figure 4:
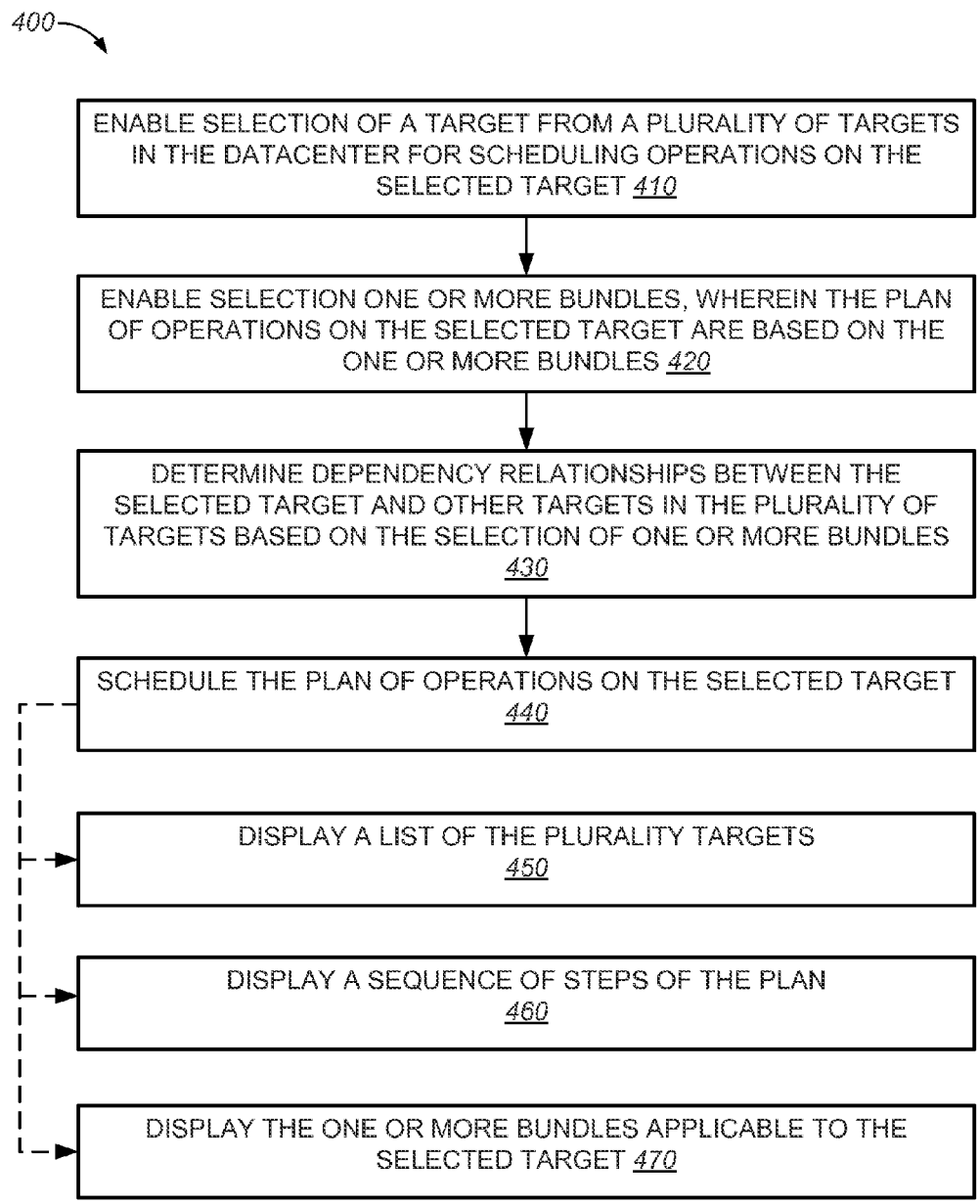
FIG. 4 depicts a flow diagram for a method for scheduling a plan of operations in a datacenter, according to various embodiments.
Figure 5:
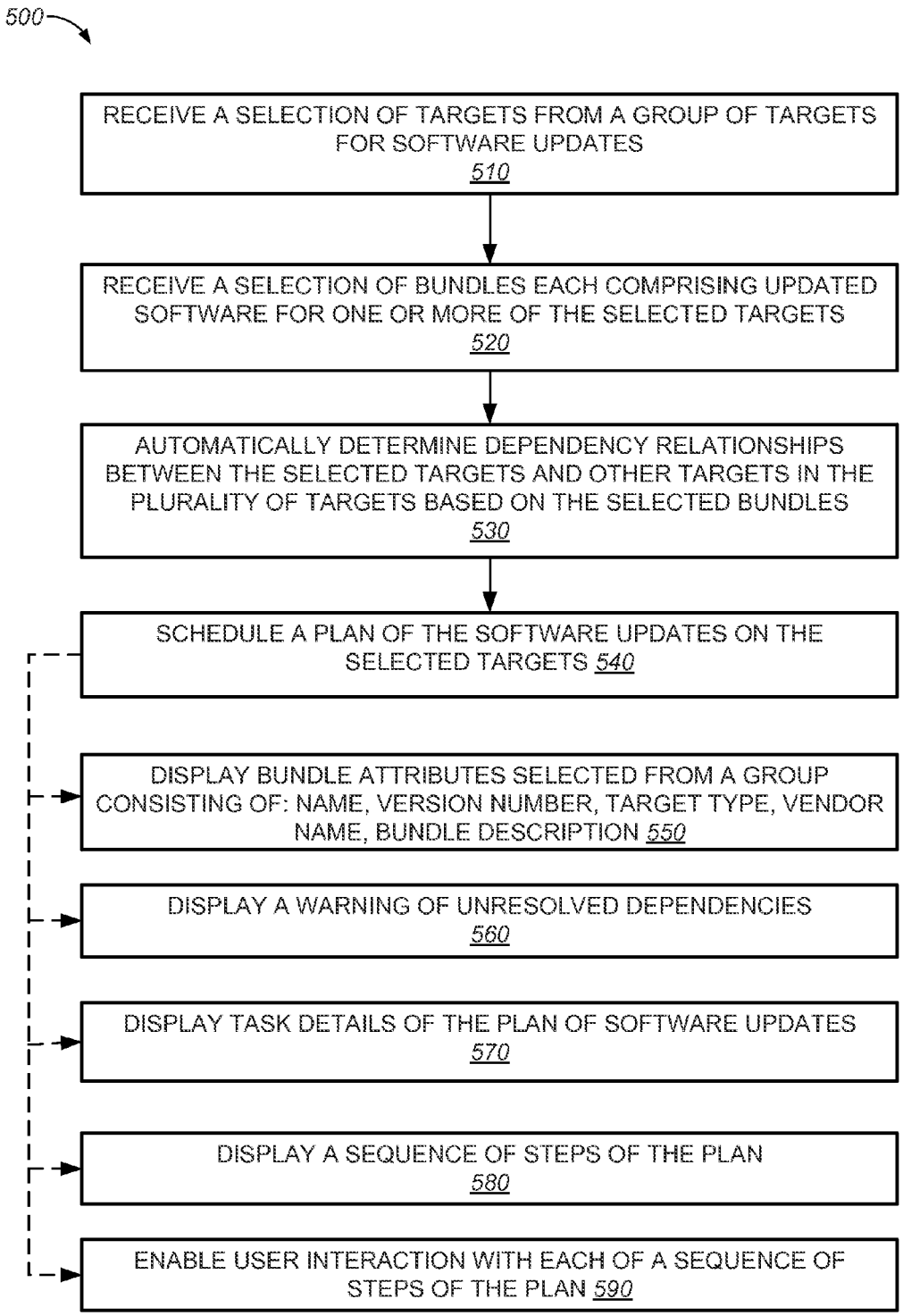
FIG. 5 depicts a flow diagram for a method for scheduling a plan of software updates in a datacenter, according to various embodiments.

The following discussion sets forth in detail the operation of some example methods of operation of embodiments. With reference to FIGS. 4 and 5, flow diagrams 400 and 500 illustrate example procedures used by various embodiments. Flow diagrams 400 and 500 include some procedures that, in various embodiments, are carried out by a processor under the control of computer-readable and computer-executable instructions. In this fashion, procedures described herein and in conjunction with flow diagrams 400 and 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., system 100 and/or system 150). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 400 and 500 such procedures are examples. That is, embodiments are well suited to performing various other procedures or variations of the procedures recited in flow diagrams 400 and 500. Likewise, in some embodiments, the procedures in flow diagrams 400 and 500 may be performed in an order different than presented and/or not all of the procedures described in one or more of these flow diagrams may be performed. It is further appreciated that procedures described in flow diagrams 400 and 500 may be implemented in hardware, or a combination of hardware with firmware and/or software (e.g., software management module 130).

FIG. 4 depicts a process flow diagram 400 for scheduling a plan of operations in a datacenter, according to various embodiments.

At 410 of flow diagram 400, selection of a target from a plurality of targets in the datacenter is enabled for scheduling operations on the selected target. For example, targets (displayed in portion 230 and portion 240) that are in the datacenter are able to be selected by a user such that they are to be modified with updated software.

At 420, selection one or more bundles is enabled, wherein the plan of operations on the selected target is based on the one or more bundles. For example, At 430, dependency relationships between the selected target and other targets in the plurality of targets are determined based on the selection of one or more bundles. For example, software bundles in portion 310 are able to be selected for updating a previously selected target.

Alternatively, software bundles, for example, displayed in portion 310, are displayed for user selection. Once selected, various targets located in the datacenter that are compatible with the selected software bundle are then displayed for selection.

At 440, the plan of operations on the selected target is scheduled. For example, the plan of operations for the targets in portion 230 (e.g., hosts) and portion 240 (e.g., virtual machines hosted by the hosts in portion 230) is displayed in plan 200. In particular, plan 200 includes various task phases 220 for each target in selected to be updated.

At 450, a list of the plurality targets is displayed. For example, various hosts (e.g., Host Y-A through Host Y-F) are displayed in portion 230 and selected to have at some of their software updated.

At 460, a sequence of steps of the plan is displayed. For example, plan 200 includes task phases 220 corresponding to each of the targets 210 that are scheduled to be updated. Each cell or box in task phases 220 correspond to a particular step on the scheduled plan.

At 470, the one or more bundles applicable to the selected target are displayed. For example, if Host Y-A is selected as a target to be updated, then software bundles that are compatible for updating Host Y-A are displayed in unified browser 112 for selection. In such an example, software bundles in portion 310 may be software bundles that are compatible for updating Host Y-A.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 for scheduling a plan of software updates in a datacenter, according to various embodiments.

At 510 of flow diagram 500, a selection of targets from a group of targets is received for software updates. For example, a user, such as an IT administrator, selects various targets (e.g., hosts and virtual machines) in the datacenter to receive software updates.

As a result, in one embodiment, target accessor 141 accesses the selected targets for software updates.

At 520, a selection of bundles each comprising updated software is received for one or more of the selected targets. For example, a list of software bundles are displayed to the user in response to selected targets to be updated. The user for example, selects a software bundle in portion 310 and subsequently selects a particular version of the selected software bundle in portion 350.

As a result, in one embodiment, bundle accessor 142 accesses the selected bundles for updating the selected targets.

At 530, dependency relationships between the selected targets and other targets in the plurality of targets are automatically determined based on the selected bundles. For example, in response to a user selecting a target (e.g., Host Y-A), dependency determining module 133 automatically determines other entities or targets (e.g., virtual machines Y-A-A, Y-A-B, Y-A-C, etc.) within the datacenter that are dependent on the selected target.

As a result, in one embodiment, dependency determiner 137 of dependency determining module 133 determines the dependencies between the selected targets.

At 540, a plan of the software updates on the selected targets is scheduled. For example, task phases 220 are scheduled for the selected targets and their dependencies (e.g., targets in portion 230 and portion 240).

As a result, in one embodiment, plan scheduler 143 plans the software updates on the selected targets.

At 550, bundle attributes are displayed and selected from a group consisting of: name, version number, target type, vendor name, or bundle description. For example, in response to a user selecting a particular version of a software bundle in portion 340, various bundle attributes are displayed in portion 350 (e.g., name, version number, target type, vendor name, bundle description).

At 560, a warning of unresolved dependencies is displayed. For example, portion 250 of plan 200 displays warning of unresolved dependencies.

At 570, task details of the plan of software updates are displayed. For example, in response to user selecting a cell corresponding to a target in task phases 220, task details are displayed (e.g., "VM Y-G-A is dependent on Host Y-G to be upgraded to have 1 software change").

At 580, a sequence of steps of the plan is displayed. For example, plan 200 includes task phases 220 corresponding to each of the targets 210 that are scheduled to be updated. Each cell or box in task phases 220 correspond to a particular step on the scheduled plan.

At 590, user interaction with each of a sequence of steps of the plan is enabled. For example, a user is able to select each cell in task phases 220. In response to the selection, information regarding the particular step associated with the select cell is displayed to the user.

In one embodiment, the user may modify the particular step associated with the selected cell. For example, the user may change the time when the particular step is to be implemented.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

II. Embodiments of Unified Visualization of a Plan of Operations in a Datacenter The discussion below is directed towards the unified visualization of the various operations in a plan for system 150 or a datacenter, as well as the interrelationships (or dependencies) of the various operations. For example, the unified visualization of the plan of operations, via unified browser 112, enables a user to visually track the progression of the execution of the software updates in the datacenter. It is noted that the discussion herein is a continuation of the concepts as provided in Section I above.

FIG. 6 depicts an embodiment of a screenshot of plan 600 for updating software in the datacenter. Plan 600 is generated via plan schedule module 134 of software management module 130.

It should be appreciated that plan 600, in one embodiment, is the same plan as plan 200. However, the screenshot of plan 600 depicts the plan during execution and details thereof. Moreover, plan 600 is grouped by dependency in portion 660 (rather than by target type as depicted in FIG. 2).

Plan 600 depicts a column that includes targets 610, a column that includes software change 612, and a column that includes task phases 620.

Portion 630 (of the column that includes targets 610 depicts Host Y-A with virtual machines (i.e., VM Y-A-A, VM Y-A-B, etc.) that are dependent on Host Y-A. Similarly, portion 240 includes a host (i.e., Host Y-B) with virtual machines (i.e., VM Y-B-A, VM Y-B-B, etc.) that are dependent on the host. Also, portion 245 includes a host (i.e., Host Y-C) with a virtual machine (i.e., VM Y-C-A) that is dependent on the host.

Task phases 620 (similar to task phases 220) depict the scheduled tasks for plan 600.

Plan schedule module 134 facilitates in scheduling a plan that includes various tasks. For example, task phases 620 include various tasks and their phases to implement the updating of a target and/or virtual machines. For example, various task phases are provided for the updating of various hosts and virtual machines in portions 630, 640 and 645.

As shown, the task phases for updating software in the datacenter are depicted in sequential order.

The task phases are provided as "cells" in the task phases 620 portion.

Each cell may depict various types of information. For example, during execution of plan 600, if the task that is associated with a cell is being executed, then the shading of the cell may indicate progression of the execution. In other words, during execution, a cell may be depicted as a dynamic progress bar that indicates the progress of the execution of the particular task associated with the cell. In particular, if a particular task is 50% complete, then the shading of the cell shaded half way or 50%.

Moreover, each cell of the task phases may be user interactive. That is, each cell may be selected. In response to the selection, various types of information associated with the selected task phase are displayed and the user may interact with such information.

For example, a cell may be selected and "task details" may be displayed which may in include task execution information. Such task details displayed in response to selecting a cell, as depicted in FIG. 6, may indicate: percentage of completion (i.e., 54% complete), task being executed (i.e., applying security patch), target name (i.e., VM Y-A-E), step details (i.e., security patch name—including a URL), dependency information (i.e., dependent on VM Y-A-E preparation; or dependents: Host Y-A upgrade).

Additional information may be displayed in task details such as debug, error or warnings during the execution of the selected task.

Portion 650 provides various types of information pertaining to the execution of plan 600. For example, portion 650 depicts the progression of the number of phases, targets and tasks for the plan. Additionally, portion 650 depicts the percentage of completion of the plan 600, as a whole.

The execution of the plan of operations, as depicted in FIG. 6, is provided with a unified visualization. In particular, each of the various operations in the plan of operations is depicted in unified manner. That is, the scheduled planning and execution of the software bundles (which are disparate with one another) are displayed with a common look and feel.

In contrast, in conventional systems, if a first target is updated by a first software bundle and a second target is updated by a disparate second software bundle. A user must login directly to the first target and execute the first software bundle via a first installation wizard, and the user must directly login to the second target and execute the second software bundle via the second disparate installation wizard.

Example Methods of Operation

Figure 7:
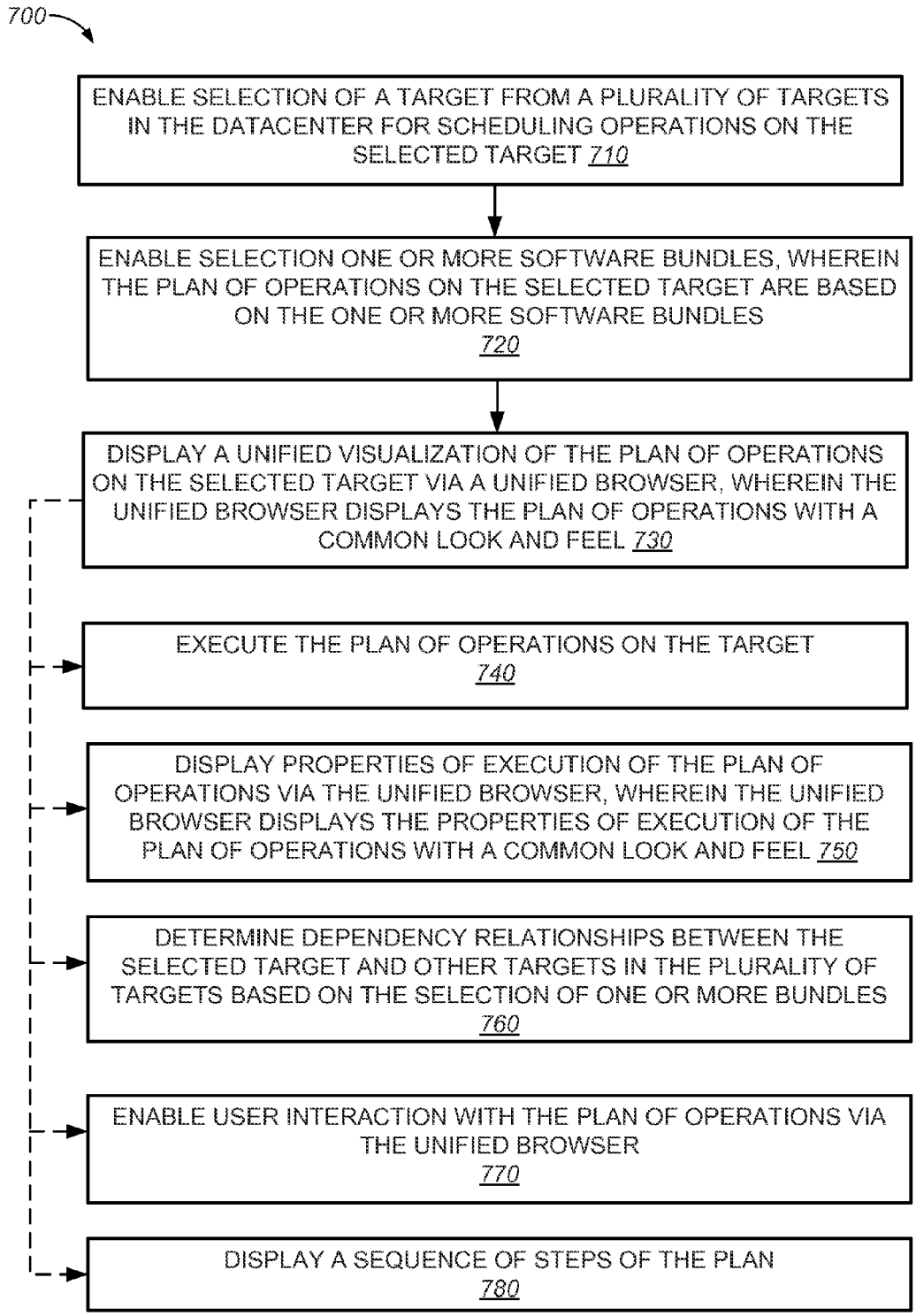
FIG. 7 depicts a flow diagram for a method for unified visualization of a plan of operations in a datacenter, according to various embodiments.
Figure 8:
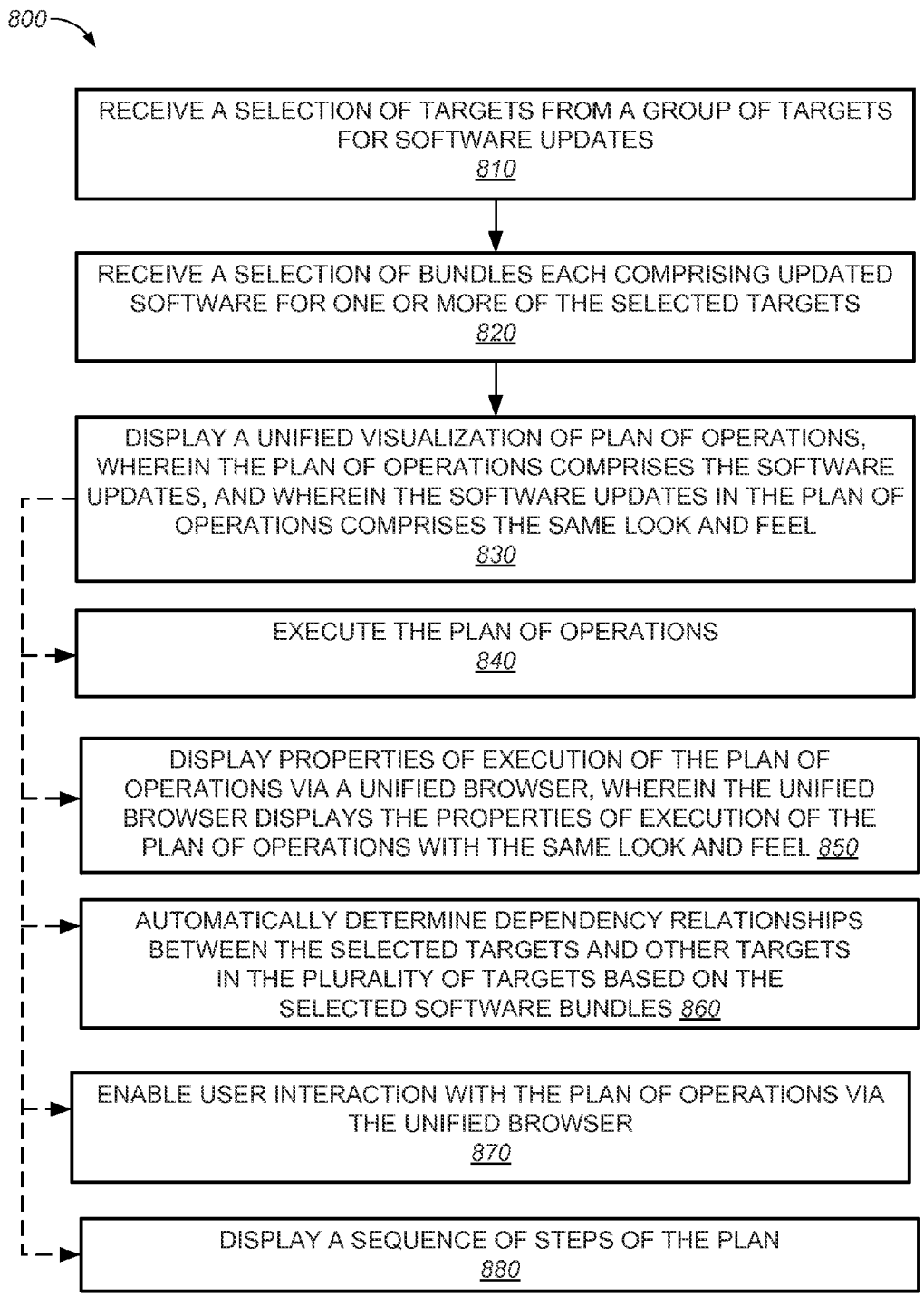
FIG. 8 depicts a flow diagram for a method for unified visualization of a plan of operations in a datacenter, according to various embodiments.

The following discussion sets forth in detail the operation of some example methods of operation of embodiments. With reference to FIGS. 7 and 8, flow diagrams 700 and 800 illustrate example procedures used by various embodiments. Flow diagrams 700 and 800 include some procedures that, in various embodiments, are carried out by a processor under the control of computer-readable and computer-executable instructions. In this fashion, procedures described herein and in conjunction with flow diagrams 700 and 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., system 100 and/or system 150). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 700 and 800 such procedures are examples. That is, embodiments are well suited to performing various other procedures or variations of the procedures recited in flow diagrams 700 and 800. Likewise, in some embodiments, the procedures in flow diagrams 700 and 800 may be performed in an order different than presented and/or not all of the procedures described in one or more of these flow diagrams may be performed. It is further appreciated that procedures described in flow diagrams 700 and 800 may be implemented in hardware, or a combination of hardware with firmware and/or software (e.g., software management module 130).

FIG. 7 depicts a process flow diagram 700 for unified visualization of a plan of operations in a datacenter according to various embodiments.

At 710 of flow diagram 700, selection of a target from a plurality of targets in the datacenter for scheduling operations on said selected target is enabled. For example, a user, such as an IT administrator, selects various targets (e.g., hosts and virtual machines) in the datacenter to receive software updates.

At 720, selection one or more software bundles is enabled, wherein the plan of operations on the selected target is based on the one or more software bundles. For example, a list of software bundles are displayed to the user in response to selected targets to be updated. The user for example, selects a software bundle in portion 310 and subsequently selects a particular version of the selected software bundle in portion 350.

At 730, a unified visualization of the plan of operations on the selected target is displayed via a unified browser, wherein the unified browser displays the plan of operations with a common look and feel. For example, the tasks in task phases 620 are based on various disparate software bundles from different vendors. In particular, the metadata in the software bundles are disparate and the individual installation wizards of the software bundles, if executed separate from software management module 130, would be visually distinct from each other.

However, software management module 130 enables the tasks in task phases 620 to be displayed by unified browser 112 such that they each appear to have a common look and feel to one another.

At 740, the plan of operations on the target is executed. For example, plan 600 as depicted in FIG. 6 is executed such that the selected targets are updated.

At 750, properties of execution of the plan of operations are via the unified browser, wherein the unified browser displays the properties of execution of the plan of operations with a common look and feel. For example, the tasks in task phases 620 that are based on disparate software bundles are executed such that depiction of the execution of task phases 620 are displayed with a common look and feel.

At 760, dependency relationships between the selected target and other targets in the plurality of targets are determined based on the selection of one or more bundles. For example, in response to a user selecting a target (e.g., Host Y-A), dependency determining module 133 automatically determines other entities or targets (e.g., virtual machines Y-A-A, Y-A-B, Y-A-C, etc.) within the datacenter that are dependent on the selected target Host Y-A.

At 770, user interaction with the plan of operations is enabled via the unified browser. For example, a user may select a particular cell in task phases 620 and modify the sequence of the task phases by moving the selected cell to another location in task phases 620.

At 780, a sequence of steps of the plan is displayed. For example, task phases 620 display the sequence of tasks for targets and their dependencies.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

FIG. 8 depicts a process flow diagram 800 for unified visualization of a plan of operations in a datacenter, according to various embodiments.

At 810, a selection of targets from a group of targets for software updates is received. For example, a user, such as an IT administrator, selects various targets (e.g., hosts and virtual machines) in the datacenter to receive software updates.

As a result, in one embodiment, target accessor 141 of plan schedule module 134 accesses the targets selected by the IT administrator.

At 820, a selection of bundles each comprising updated software for one or more of the selected targets is received. For example, a list of software bundles are displayed to the user in response to selected targets to be updated. The user for example, selects a software bundle in portion 310 and subsequently selects a particular version of the selected software bundle in portion 350.

As a result, in one embodiment, bundle accessor 142 of plan schedule module 134 accesses the selected bundles.

At 830, a unified visualization of plan of operations is displayed, wherein the plan of operations comprises the software updates, and wherein the software updates in the plan of operations comprises a common look and feel. For example, the tasks in task phases 620 are based on various disparate software bundles from different vendors. In particular, the metadata in the software bundles are disparate and the individual installation wizards of the software bundles, if executed separate from software management module 130, would be visually distinct from each other.

However, software management module 130 enables the tasks in task phases 620 to be displayed by unified browser 112 such that they each appear to have a common look and feel to one another.

As a result, in one embodiment, plan scheduler 143 of plan schedule module generates a plan of operations. The plan of operations is then displayed via plan displayer 136 of unified browser module 132.

At 840, the plan of operations is executed. For example, plan 600 as depicted in FIG. 6 is executed such that the selected targets are updated as planned.

At 850, properties of execution of the plan of operations are displayed via a unified browser, wherein the unified browser displays the properties of execution of the plan of operations with a common look and feel. For example, the tasks in task phases 620 that are based on disparate software bundles are executed such that depiction of the execution of task phases 620 are displayed with a common look and feel.

At 860, dependency relationships between the selected targets and other targets in the plurality of targets are automatically determined based on the selected software bundles. For example, in response to a user selecting a target (e.g., Host Y-A), dependency determining module 133 automatically determines other entities or targets (e.g., virtual machines Y-A-A, Y-A-B, Y-A-C, etc.) within the datacenter that are dependent on the selected target Host Y-A.

At 870, user interaction with the plan of operations is enabled via the unified browser. For example, a user may select a particular cell in task phases 620 and modify the sequence of the task phases by moving the selected cell to another location in task phases 620.

At 880, a sequence of steps of the plan is displayed. For example, task phases 620 display the sequence of tasks for targets and their dependencies.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

III. Embodiments of a Unified Graphical User Interface for Displaying a Plan of Operations in a Datacenter The discussion below is directed towards the unified graphical user interface (or unified browser 112) that is utilized for a unified visualization of the various operations in a plan for system 150 or a datacenter. For example, the unified graphical user interface is able to access the metadata in software bundles 122 and interpret the metadata in such a way that the implementation of the software bundles (as displayed in the plan of operations) are displayed with a common or similar look and feel.

As a result, the user is able to effectively visually track the planning and the implementation of the software updates in the datacenter. It is noted that the discussion herein is a continuation of the description of the concepts as provided in the sections above.

Referring again to FIG. 1, a user may select various software bundles 122 for updating various targets in the datacenter. The software bundles each include metadata that pertains to the implementation of the respective software bundle. The metadata can include information or logic related to how the software bundle is implemented (e.g., deploying, upgrading, patching) on a selected target.

The metadata in a bundle can also provide instructions or logic pertaining to settings, requirements and dependencies for proper installation of the software bundle.

Moreover, the metadata can provide information as to whether the software bundle is to be deployed versus whether the software bundle is to upgrade or patch a target in the datacenter.

In one example, the metadata provides instructions on how the wizard (for installing, deploying, patching, etc.) for the software bundle is displayed and functions. As a result, the metadata pertaining to the wizard of one software bundle is different than the metadata pertaining to the wizard of another software bundle.

In various embodiments, unified browser module 132 accesses the metadata of the disparate software bundles (in response to a user selecting the disparate software bundles). Based on the accessed disparate software bundles, the unified browser module 132 displays, with a common look and feel, the plan of operations and the execution thereof. For example, referring to FIG. 2, the task plans for each host that includes updating software from disparate software bundles is presented, via unified browser 112, in a similar fashion or with a common look and feel.

In particular, unified browser module 132 accesses the metadata of the disparate software bundles and interprets the disparate metadata such that visualization of the plan of operations and the execution thereof is displayed in a unifying manner. For example, referring to FIG. 2, task phases 220 pertaining to various implementations of the software bundles are displayed with a unifying and common look and feel (rather than a disparate look and feel for each individual implementation of the software bundle).

Moreover, referring to FIG. 6, task phases 620 pertaining to various implementations of the execution software bundles are displayed with a unifying and common look and feel (rather than a disparate look and feel for each individual implementation of the execution of software bundle).

Example Methods of Operation

Figure 9:
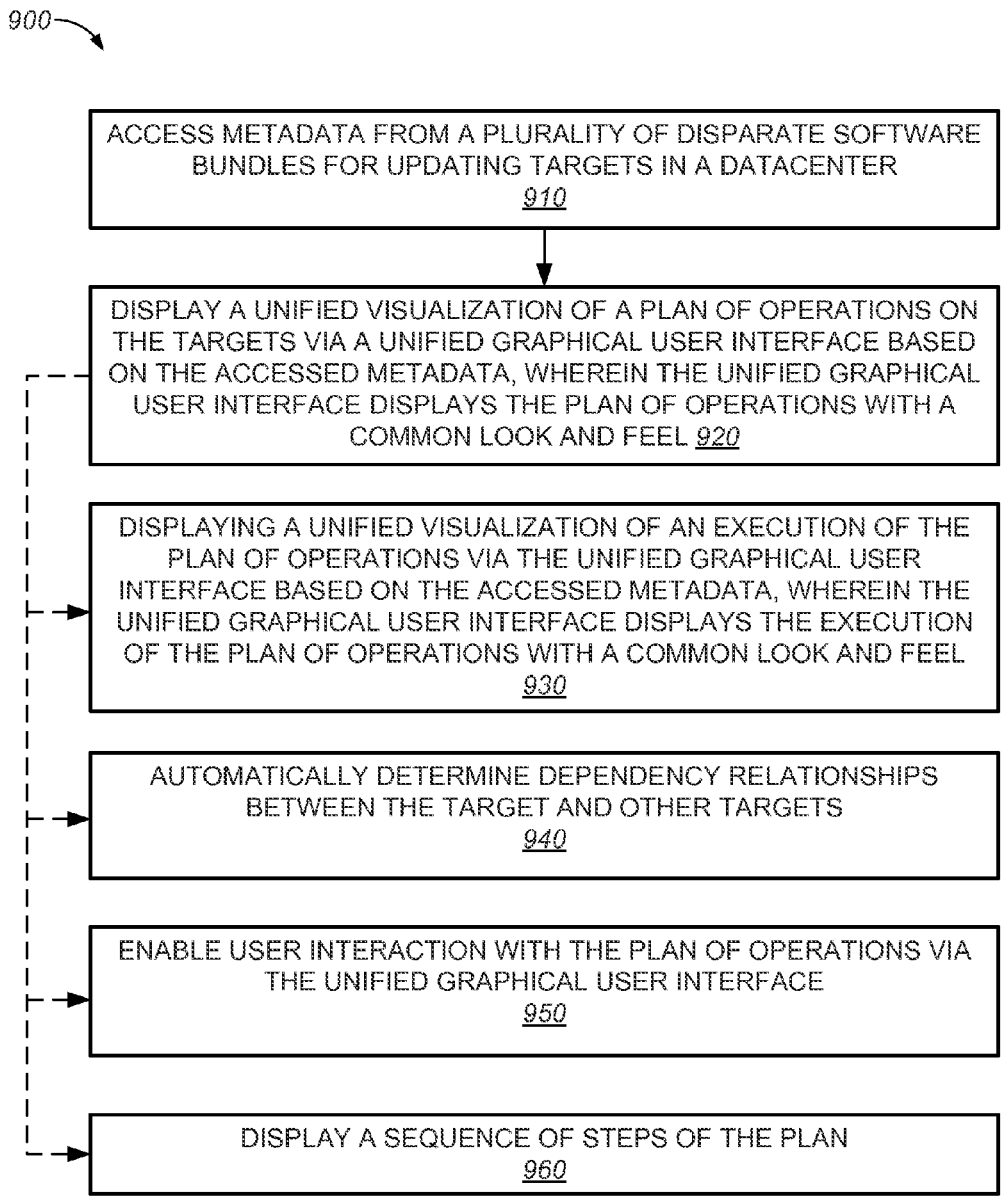
FIG. 9 depicts a flow diagram for a method for a unified graphical user interface for displaying a plan of operations in a datacenter, according to various embodiments.
Figure 10:
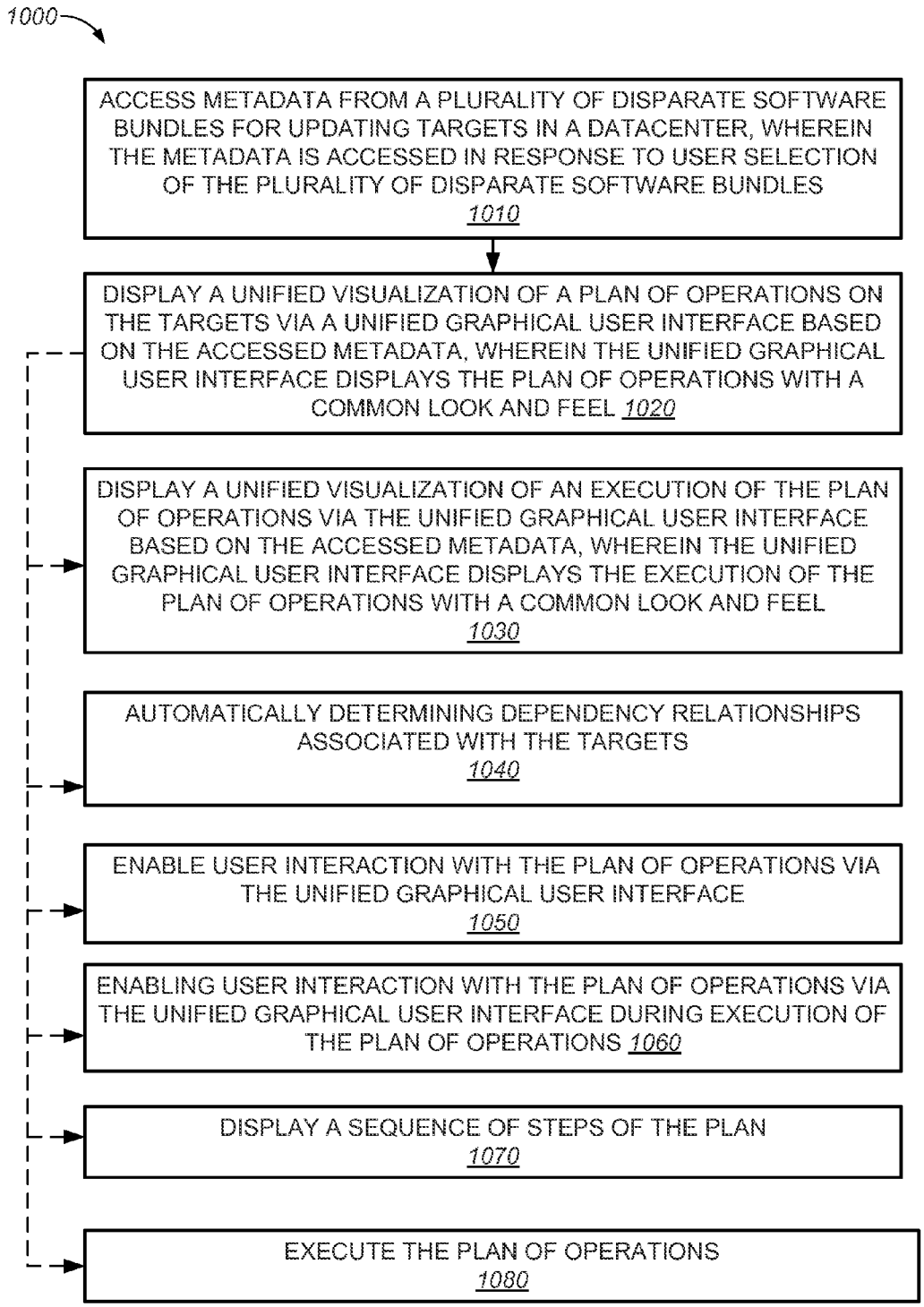
FIG. 10 depicts a flow diagram for a method for a unified graphical user interface for displaying a plan of operations in a datacenter, according to various embodiments.

The following discussion sets forth in detail the operation of some example methods of operation of embodiments. With reference to FIGS. 9 and 10, flow diagrams 900 and 1000 illustrate example procedures used by various embodiments. Flow diagrams 900 and 1000 include some procedures that, in various embodiments, are carried out by a processor under the control of computer-readable and computer-executable instructions. In this fashion, procedures described herein and in conjunction with flow diagrams 900 and 1000 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., system 100 and/or system 150). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 900 and 1000 such procedures are examples. That is, embodiments are well suited to performing various other procedures or variations of the procedures recited in flow diagrams 900 and 1000. Likewise, in some embodiments, the procedures in flow diagrams 900 and 1000 may be performed in an order different than presented and/or not all of the procedures described in one or more of these flow diagrams may be performed. It is further appreciated that procedures described in flow diagrams 900 and 1000 may be implemented in hardware, or a combination of hardware with firmware and/or software (e.g., software management module 130).

FIG. 9 depicts a process flow diagram 900 for a unified graphical user interface for displaying a plan of operations in a datacenter according to various embodiments.

At 910 of flow diagram 900, metadata from a plurality of disparate software bundles is accessed for updating targets in a datacenter. For example, various targets (e.g., targets in portion 230) are selected to be updated. Various software bundles are then selected for updating the selected targets.

Each of the selected software bundles includes metadata that provides logic or information pertaining to the updating of targets by the software bundles. The unified browser module 132 accesses such metadata and interprets the disparate metadata for the unified visualization of the plan of operations (e.g., plan 200).

At 920, a unified visualization of a plan of operations on the targets is displayed via a unified graphical user interface based on the accessed metadata, wherein the unified graphical user interface displays the plan of operations with a common look and feel. For example, plan 200 is displayed via unified browser 112 such that there is a unified visualization of the particular task events for the implementation of the disparate software bundles.

At 930, a unified visualization of an execution of the plan of operations is displayed via the unified graphical user interface based on the accessed metadata, wherein the unified graphical user interface displays the execution of the plan of operations with a common look and feel. For example, plan 600 is displayed via unified browser 112 such that there is a unified visualization of the execution of the particular task events for the implementation of the disparate software bundles.

At 940, dependency relationships between the target and other targets are automatically determined. For example, in response to a user selecting a target (e.g., Host Y-A), dependency determining module 133 automatically determines other entities or targets (e.g., virtual machines Y-A-A, Y-A-B, Y-A-C, etc.) within the datacenter that are dependent on the selected target Host Y-A.

At 950, user interaction with the plan of operations via the unified graphical user interface is enabled. For example, a user may select a particular cell in task phases 620 and modify the sequence of the task phases by moving the selected cell to another location in task phases 620.

At 960, a sequence of steps of the plan is displayed. For example, task phases 620 display the sequence of tasks for targets and their dependencies.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

FIG. 10 depicts a process flow diagram 1000 for a unified graphical user interface for displaying a plan of operations in a datacenter according to various embodiments.

At 1010 of flow diagram 1000, metadata from a plurality of disparate software bundles for updating targets in a datacenter is accessed, wherein the metadata is accessed in response to user selection of the plurality of disparate software bundles. For example, various targets (e.g., targets in portion 230) are selected to be updated. Various software bundles are then selected for updating the selected targets.

Each of the selected software bundles includes metadata that provides logic or information pertaining to the updating of targets by the software bundles. The unified browser module 132 accesses such metadata and interprets the disparate metadata for the unified visualization of the plan of operations (e.g., plan 600).

As a result, in one embodiment, metadata accessor 135 accesses the metadata from the plurality of disparate software bundles.

At 1020, a unified visualization of a plan of operations on the targets is displayed via a unified graphical user interface based on the accessed metadata, wherein the unified graphical user interface displays the plan of operations with a common look and feel. For example, a plan of operations, such as plan 200, is displayed via unified browser 112 such that there is a unified visualization of the particular task events (and the execution thereof) for the implementation of the disparate software bundles.

As a result, in one embodiment, plan displayer 136 facilitates in displaying a unified visualization of a plan of operations on the targets via the unified graphical user interface based on the accessed metadata, wherein the unified graphical user interface displays the plan of operations with a common look and feel.

At 1030, display a unified visualization of an execution of the plan of operations via the unified graphical user interface based on the accessed metadata, wherein the unified graphical user interface displays the execution of the plan of operations with a common look and feel. For example, a plan of operations, such as plan 600, is displayed via unified browser 112 such that there is a unified visualization of the particular task events (and the execution thereof) for the implementation of the disparate software bundles.

At 1040, dependency relationships associated with the targets are automatically determined. For example, in response to a user selecting targets (e.g., Host Y-A, Host Y-B, Host Y-C, etc.), dependency determining module 133 automatically determines other entities or targets (e.g., virtual machines Y-A-A, Y-B-A, Y-C-A, etc.) within the datacenter that are dependent on the selected targets.

At 1050, user interaction with the plan of operations is enabled via the unified graphical user interface. For example, a user may select a particular cell in task phases 620 and modify the sequence of the task phases by moving the selected cell to another location in task phases 620. As a result, the task phases are updated in response to the user modification.

At 1060, enabling user interaction with the plan of operations via the unified graphical user interface during execution of the plan of operations. For example, while a plan is executing, a user may select a particular cell in task phases 620 and modify the sequence of the task phases by moving the selected cell to another location in task phases 620. In another example, a user may select a cell that is currently executing and task details for the particular cell are displayed.

At 1070, a sequence of steps of the plan is displayed. For example, task phases 620 display the sequence of tasks for targets and their dependencies.

At 1080, the plan of operations is executed. For example, plan 600 is instructed to execute immediately or at a later time. During execution, the task phases on the plan are implemented such that the selected targets are properly updated.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

IV. Examples of Selection of Relevant Software Bundles

The discussion below is directed towards the display and selection of software bundles that are relevant and correspond to targets selected for upgrading. For example, in response to selection of a target for software upgrade, various software bundles are displayed to a user for selection that are particular relevant to the displayed target.

FIG. 11 depicts an embodiment of a screenshot of relevant bundles 1100 for updating software selected targets in a datacenter. The selected targets and corresponding software bundles will be utilized to generate a plan of operations (e.g., plan 300 or plan 600) as described herein.

Plan 600 is generated via plan schedule module 134 of software management module 130.

Referring to FIG. 11, one or more targets are selected for software upgrade. For example, a user selects target 1110 and target 1120 in system 150 (or datacenter) for updating software associated with the selected targets.

In response to the selected targets, software bundles particularly relevant to the selected targets are displayed for selection. For instance, in response to selection of target 1110 (e.g., ESX 4.0 host), software bundles are displayed in portion 1112 that are particular relevant to target 1110. More specifically, other software bundles in storage 120 that are not configured for updating target 1110 are not displayed in portion 1112.

Similarly, target 1120 (e.g., ESX 5.0 host) is also selected for software updates. In response to selection of target 1120, software bundles are displayed in portion 1122 that are particularly relevant to target 1120. More specifically, other software bundles in storage 120 that are not configured for updating target 1120 are not displayed in portion 1122.

In various embodiments, software bundles that are not applicable to a selected target may be displayed but are not able to be selected by a user. For example, they non-relevant software bundles may be "greyed out."

Targets may be homogeneous or non-homogeneous. In general, targets that are homogenous have effectively the same software versions. For example, a first target that is an ESX 4.0 host is homogenous to another target that is also an ESX 4.0 host. However, a first target that is an ESX 4.0 host is not homogenous to another target that is an ESX 5.0 host.

In one embodiment, in response to selection of non-homogenous targets, software bundles applicable to a first target (e.g., target 1110—ESX 4.0 host) is displayed with respect to the first target (but not the second target), and software applicable to the second target (e.g., target 1120—ESX 5.0 host) is displayed with respect to the second target (but not the first target).

In another embodiment, in response to selection of non-homogenous targets, software bundles applicable to both the first target (e.g., target 1110—ESX 4.0 host) the second target (e.g., target 1120—ESX 5.0 host) are displayed with respect to both the first and second targets. For example, if Bundle X applies to both the first and second non-homogeneous targets, then Bundle X will be displayed for selection to update both the first and second targets.

In one embodiment, targets may be changed from a non-homogenous state to a homogenous state. For example, an ESX 4.0 host and an ESX 5.0 host are non-homogenous. However, it may be desired that the two targets become homogenous. As such, instructions may be provided to software management module 130 to display software bundles to modify the targets such that they are homogenous (e.g., change the ESX 4.0 host to an ESX 5.0 host).

In another embodiment, targets may be changed from a homogenous state to a non-homogenous state. For example, a first ESX 4.0 host and a second ESX 4.0 host are homogenous. However, it may be desired that the two targets become non-homogenous. As such, instructions may be provided to software management module 130 to display software bundles to modify the targets such that they are non-homogenous (e.g., change the first ESX 4.0 host to an ESX 5.0 host).

Summary information for a selected target, in one embodiment, is displayed in portion 1130. Summary information can be, but is not limited to, target name, bundle name, bundle version, bundle description, vendor name, upload date, tags, etc.

Additionally, various types of bundle information for the displayed bundles are displayed. For example, for a particular bundle that is displayed for selection the following information may also be displayed: installed version, bundle version and type (e.g., install, upgrade, etc.)

The screenshot, as depicted in FIG. 11, enabled a user to determine software information status, such as whether a target is fully installed or partially installed with various software bundles.

Example Methods of Operation

Figure 12:
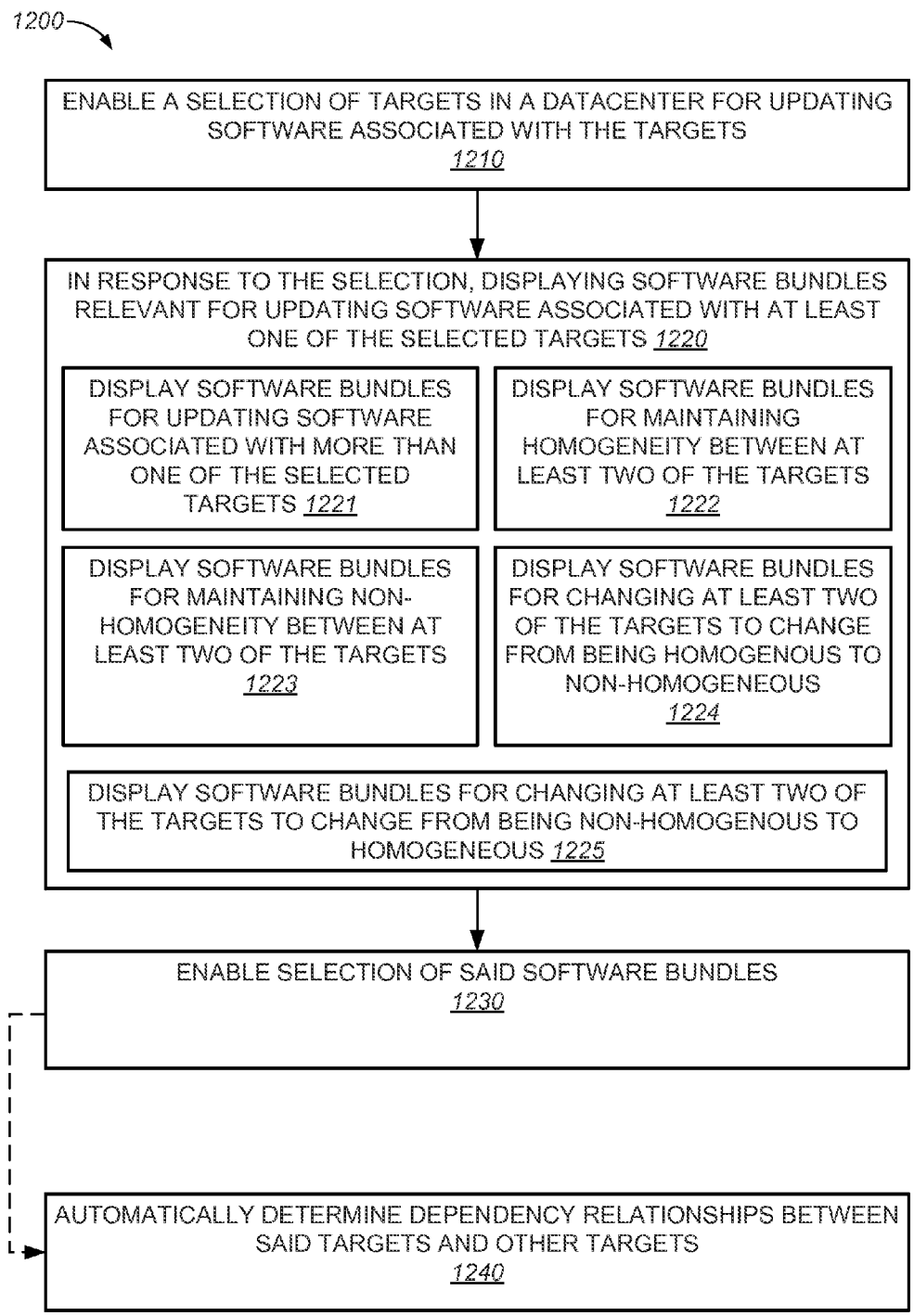
FIG. 12 depicts a flow diagram for a method for selection of relevant software bundles, according to various embodiments.
Figure 13:
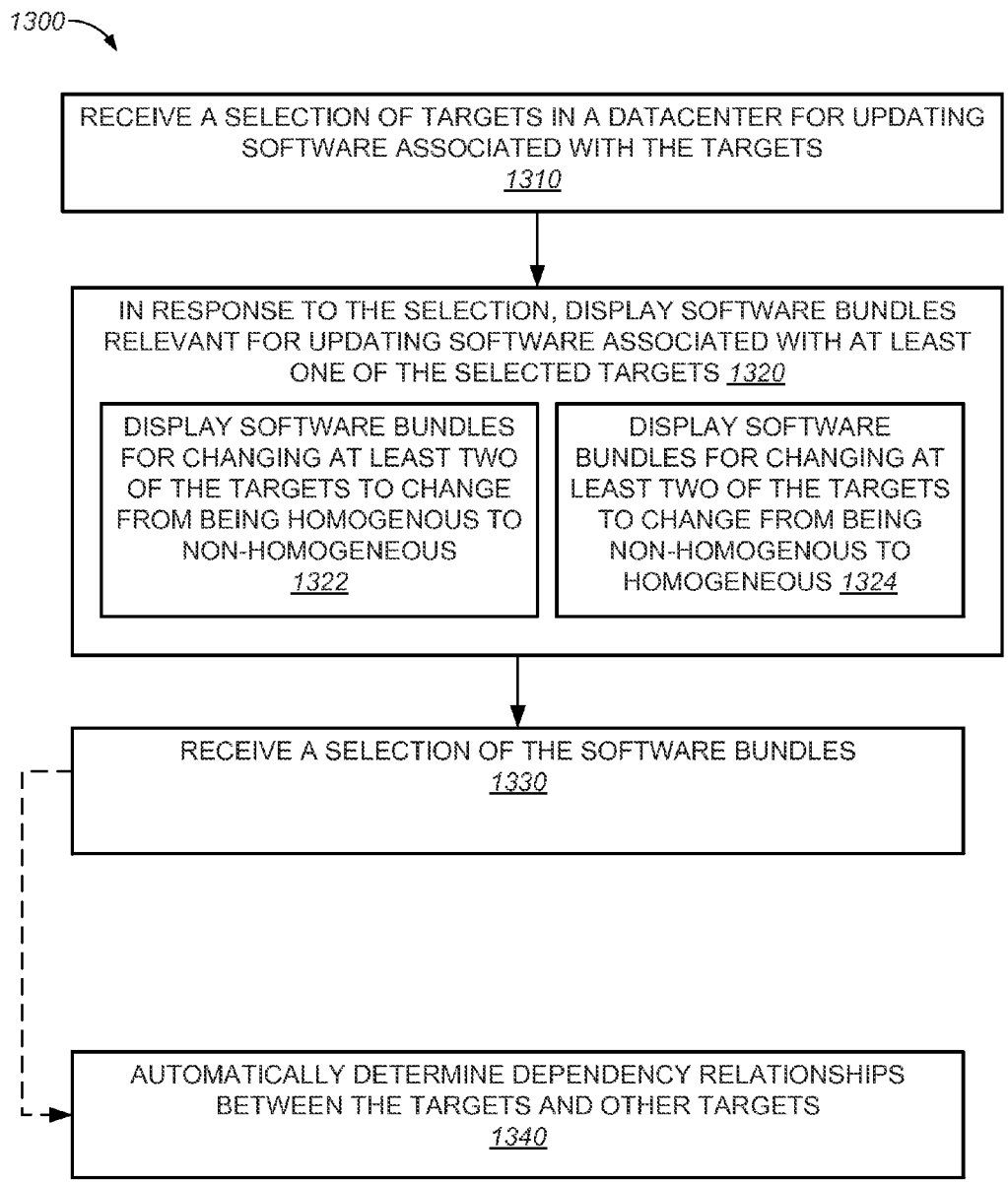
FIG. 13 depicts a flow diagram for a method for selection of relevant software bundles, according to various embodiments.

The following discussion sets forth in detail the operation of some example methods of operation of embodiments. With reference to FIGS. 12 and 13, flow diagrams 1200 and 1300 illustrate example procedures used by various embodiments. Flow diagrams 1200 and 1300 include some procedures that, in various embodiments, are carried out by a processor under the control of computer-readable and computer-executable instructions. In this fashion, procedures described herein and in conjunction with flow diagrams 1200 and 1300 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., system 100 and/or system 150). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1200 and 1300 such procedures are examples. That is, embodiments are well suited to performing various other procedures or variations of the procedures recited in flow diagrams 1200 and 1300. Likewise, in some embodiments, the procedures in flow diagrams 1200 and 1300 may be performed in an order different than presented and/or not all of the procedures described in one or more of these flow diagrams may be performed. It is further appreciated that procedures described in flow diagrams 1200 and 1300 may be implemented in hardware, or a combination of hardware with firmware and/or software (e.g., software management module 130).

FIG. 12 depicts a process flow diagram 1200 for selection of relevant software bundles, according to various embodiments.

At 1210 of flow diagram 1200, a selection of targets in a datacenter is enabled for updating software associated with the targets. For example, target 1110 and target 1120 are selected for software updates.

At 1220, in response to the selection, software bundles relevant for updating software associated with at least one of the selected targets are displayed. For example, in response to selection of target 1110 for software updates, the software bundles of software bundles 122 that are configured for updated target 1110 are displayed in portion 1112.

At 1221, display software bundles for updating software associated with more than one of the selected targets. For example, targets 1110 and 1122 are selected for updating.

Accordingly, software bundles that are capable of updating targets 1110 and 1122 are displayed in portions 1112, and 1122, respectively.

At 1222, display software bundles for maintaining homogeneity between at least two of the targets. For example, in one embodiment targets 1110 and 1120 are homogenous. As such, software bundles displayed for updating 1110 and 1120 enable targets 1110 and 1120 to remain homogenous.

At 1223, display software bundles for maintaining non-homogeneity between at least two of the targets. For example, in one embodiment targets 1110 and 1120 are non-homogenous. As such, software bundles displayed for updating 1110 and 1120 enable targets 1110 and 1120 to remain non-homogenous.

At 1224, display software bundles for changing at least two of the targets to change from being homogenous to non-homogeneous. For example, in one embodiment targets 1110 and 1120 are homogenous. As such, software bundles displayed for updating 1110 and 1120 enable targets 1110 and 1120 to be non-homogenous after being updated.

At 1225, display software bundles for changing at least two of the targets to change from being non-homogenous to homogeneous. For example, in one embodiment targets 1110 and 1120 are non-homogenous. As such, software bundles displayed for updating 1110 and 1120 enable targets 1110 and 1120 to homogenous after being updated.

At 1230, enable selection of the software bundles. For example, bundles displayed in portion 1112 and 1122 are able to be selected such that they update the relative targets.

At 1240, automatically determine dependency relationships between said targets and other targets. For example, in response to a user selecting targets 1110 and 1120, dependency determining module 133 automatically determines other entities or within the datacenter that are dependent on the selected targets.

It is noted that any of the procedures, stated above, regarding flow diagram 1200 may be implemented in hardware, or a combination of hardware with firmware and/or software. For example, any of the procedures are implemented by a processor(s) of a cloud environment and/or a computing environment.

FIG. 13 depicts a process flow diagram 1300 for selection of relevant software bundles, according to various embodiments.

At 1310 of flow diagram 1300, receive a selection of targets in a datacenter for updating software associated with said targets. For example, target 1110 and target 1120 are selected for software updates.

As a result, in on embodiment, target accessor 141 accesses the selected targets in a datacenter for software updates.

At 1320, in response to said selection, display software bundles relevant for updating software associated with at least one of said selected targets. For example, in response to selection of target 1110 for software updates, the software bundles of software bundles 122 that are configured for updated target 1110 are displayed in portion 1112.

As a result, in one embodiment, bundle displayer 139 displays the software bundles relevant for updating software associated with at least one of the selected targets.

At 1322, displaying software bundles for changing at least two of said targets to change from being homogenous to non-homogeneous. For example, in one embodiment targets 1110 and 1120 are homogenous. As such, software bundles displayed for updating 1110 and 1120 enable targets 1110 and 1120 to be non-homogenous after being updated.

At 1324, displaying software bundles for changing at least two of said targets to change from being non-homogenous to homogeneous. For example, in one embodiment targets 1110 and 1120 are non-homogenous. As such, software bundles displayed for updating 1110 and 1120 enable targets 1110 and 1120 to homogenous after being updated.

At 1330, receive a selection of said software bundles. For example, bundles displayed in portion 1112 and 1122 are able to be selected such that they update the relative targets.

As a result, in one embodiment, bundle accessor 142 accesses the selected relevant software bundles for updating the selected targets.

At 1340, automatically determine dependency relationships between said targets and other targets. For example, in response to a user selecting targets 1110 and 1120, dependency determining module 133 automatically determines other entities or within the datacenter that are dependent on the selected targets.

It is noted that any of the procedures, stated above, regarding flow diagram 1300 may be implemented in hardware, or a combination of hardware with firmware and/or software. For example, any of the procedures are implemented by a processor(s) of a cloud environment and/or a computing environment.

V. Examples of Deduplication of End User License Agreements

The discussion below is directed towards the deduplication of the display and acceptance of end user license agreements (EULAs). In general, a EULA establishes the purchaser's or user's right to use the software (e.g., software bundle). For example, a EULA in a software bundle provides rights to a user of the software bundle to update software of targets in the datacenter with the software bundle.

In conventional systems, numerous targets in a datacenter may be upgraded with software bundles. For each update of a target with a software bundle, a EULA is presented to a user and the user must manually accept the EULA in order for the target to be properly updated with the software. Accordingly, if there are thousands of instances of targets updated with a software bundle, there may be thousands of instances where a EULA is presented and required to be manually accepted for the targets to be properly updated with the software.

As will be described in further detail below, EULA deduplication module 138 enables for deduplication of EULAs. That is, in some embodiments, only a single EULA is displayed for acceptance in place of a numerous (e.g., hundreds or thousands) EULAs being displayed for acceptance by a user.

Figure 14:
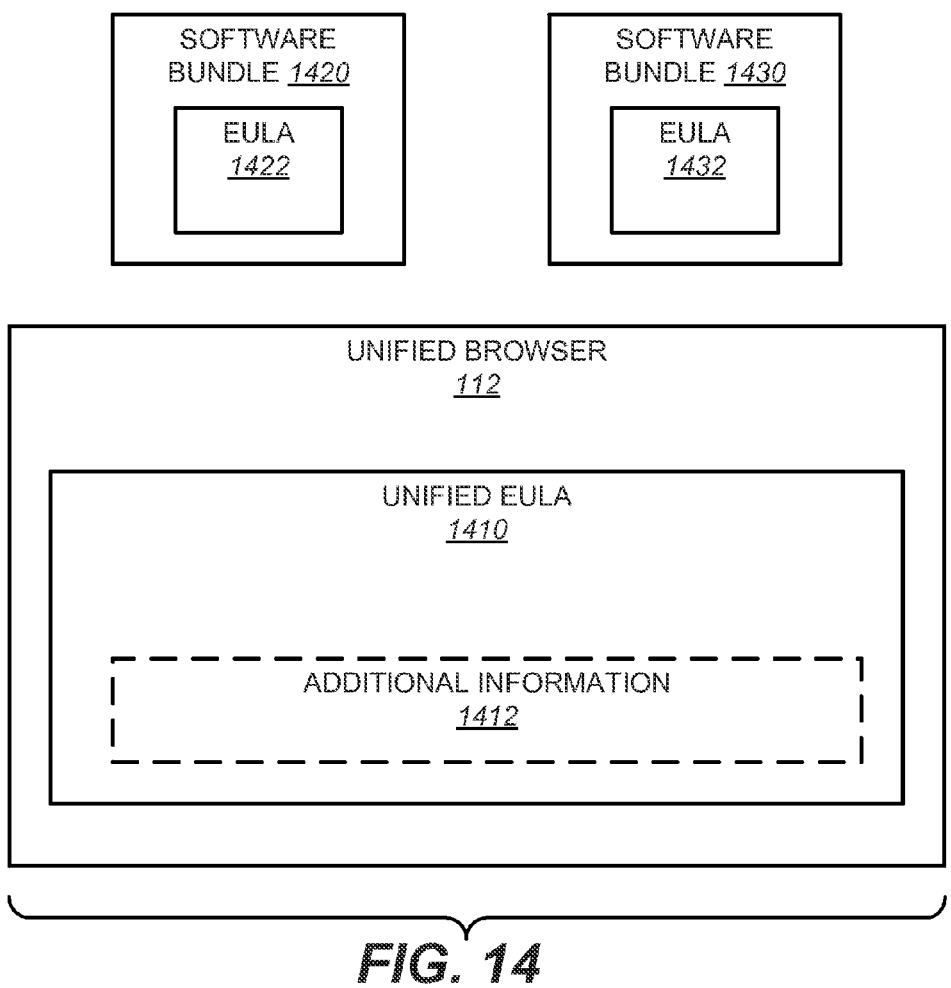
FIG. 14 depicts a block diagram of unified EULA, accordingly to various embodiments.

FIG. 14 depicts a block diagram of deduplication of EULAs, according to various embodiments.

Referring now to at least FIG. 14, various targets are selected to be updated in a datacenter. For example, numerous targets (e.g., hosts in portion 230 of plan 200) are selected for at least one software upgrade, such as a software upgrade from software bundle 1420.

EULA deduplication module 138 accesses EULA 1422 within the software bundle that is selected for updating the targets. The EULA can be a part of the metadata within the software bundle.

EULA deduplication module 138 then processes the accessed EULA 1422 such that it is displayed via unified browser as unified EULA 1410. In particular, unified EULA 1410 (or deduplicated EULA) is a single instance of EULA 1422 that is displayed to a user such that the user is able to accept the unified EULA 1410 rather than accept multiple instances of EULA 1422.

For example, in conventional systems, if twenty targets are selected for updating by software bundle 1420, then each instance of the software bundle upgrading one of the twenty targets requires EULA 1422 being displayed to the user and accepted by the user. In other words, EULA 1422 will be displayed twenty times and be required to be accepted twenty times by a user.

However, in view of the example above, software management module 130 enables for a single instance of unified EULA 1410 to be displayed and enabled for updating of the twenty targets. As a result, the display of a single instance of unified EULA 1410 (and acceptance thereof) replaces the need to display and accept twenty instances of EULA 1422 for proper updating of the twenty targets.

In one embodiment, software bundle 1420 is provided by a third party vendor. That is, the vendor of software bundle 1420 is different than the vendor that provides software management module 130. In another embodiment, software bundle 1420 is provided by the same vendor that provides software management module 130.

Unified EULA 1410, in one embodiment, is EULA 1422.

In another embodiment, unified EULA 1410 is a modification of EULA 1422. For example, the vendor of software management module 130 may add additional information 1412 to EULA 1422 to create unified EULA 1410.

Additional information 1412 can be any information (e.g., legal information) pertaining to the installation of software bundle via software management module 130.

In various embodiments, EULAs as described herein may be a pre-general ability (GA) license such as a beta license agreement, a universal EULA of a vender (e.g., universal EULA for the vendor of software management module 130), a product specific EULA.

It should be appreciated that various software bundles, such as software bundle 1420 and software bundle 1430, are selected to upgrade various targets (e.g., hosts in portion 230 of plan 200) in a datacenter. For example, a first set of targets may be updated by software bundle 1420 and a second set of targets may be upgraded by software bundle 1430, or some targets may be upgraded by both software bundle 1420 and software bundle 1430.

Accordingly, EULA deduplication module 138 accesses EULA 1422 from software bundle 1420 and EULA 1432 from software bundle 1430.

EULA deduplication module 138 then determines if EULA 1422 and EULA 1432 are sufficiently similar. For example, EULA deduplication module 138 performs a search (e.g., text search, pattern matching, and checksum) to determine if significant portions of EULA 1422 and EULA 1432 are sufficiently similar to each other. If so, then unified EULA 1410 is generated that includes the significant matching portions between both EULA 1422 and EULA 1432.

According, a single instance of unified EULA 1410 (or deduplicated EULA) is displayed to the user such that the user is able to accept the unified EULA 1410 rather than accept multiple instances of EULA 1422 and EULA 1423.

In general, EULAs (e.g., EULA 1422 and EULA 1432) are determined to be sufficiently similar if the text and/or legal provisions in the EULA are similar to an extent such that the EULAs are able to be accepted via a single acceptance. For example, if two EULAs are exactly the same then the two EULAs, then a single EULA may be displayed (rather than two) and a single acceptance may be made to accept both EULAs.

In another example, EULA deduplication module 138 analyzes two separate EULAS (e.g., EULA 1422 and EULA 1432) and determines that the EULAs are sufficiently similar (but not matching). For instance, primary legal provisions in both EULAs are matching or almost matching, while insignificant provisions in one or both of the EULAs may or may not match.

In various embodiments, when various EULAs, such as EULA 1422 and EULA 1432, are deduplicated into unified EULA 1410, various insignificant portions of EULA 1422 and EULA 1432 may be removed and not displayed in unified EULA 1410.

Unified EULA 1410 is displayed, in one embodiment, during execution of a plan of operations. For example, once a plan is instructed to execute, various software bundles are utilized to update various targets in the datacenter according to the plan of operations. During the execution of the plan, unified EULA 1410 is displayed and presented to the user for acceptance. If unified EULA 1410 is accepted then the execution of plan of operations continues as scheduled. However, if unified EULA 1410 is not accepted by a user, then the targets that are scheduled to be updated by software bundles associated with the unified EULA 1410 may not be updated as scheduled.

Also, in one embodiment, when a plan of operations is scheduled, the EULAs for the software bundles are displayed via unified EULA 1410 for acceptance. If the plan of operations is changed or the content is changed, the unified EULA 1410 is displayed for acceptance.

If EULA deduplication module 138 determines that the EULA for an update release is the same as the EULA of its previously installed major/minor version, the EULA for the updated release need not be displayed and accepted. The prior EULA may be binding already.

If EULA deduplication module 138 determines that two products or software bundles have the same EULA, the EULA may be displayed one time with instructions that the EULA applies to both/several products.

Example Methods of Operation

Figure 15:
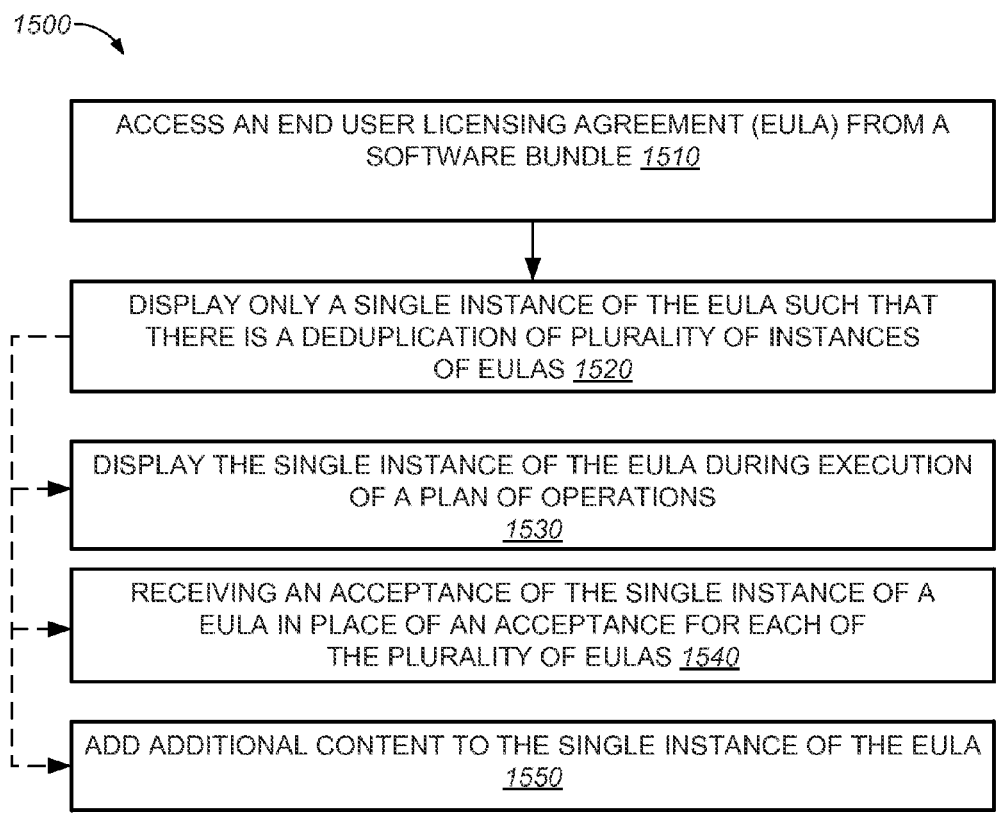
FIG. 15 depicts a flow diagram for a method for deduplication of EULAs, according to various embodiments.
Figure 16:
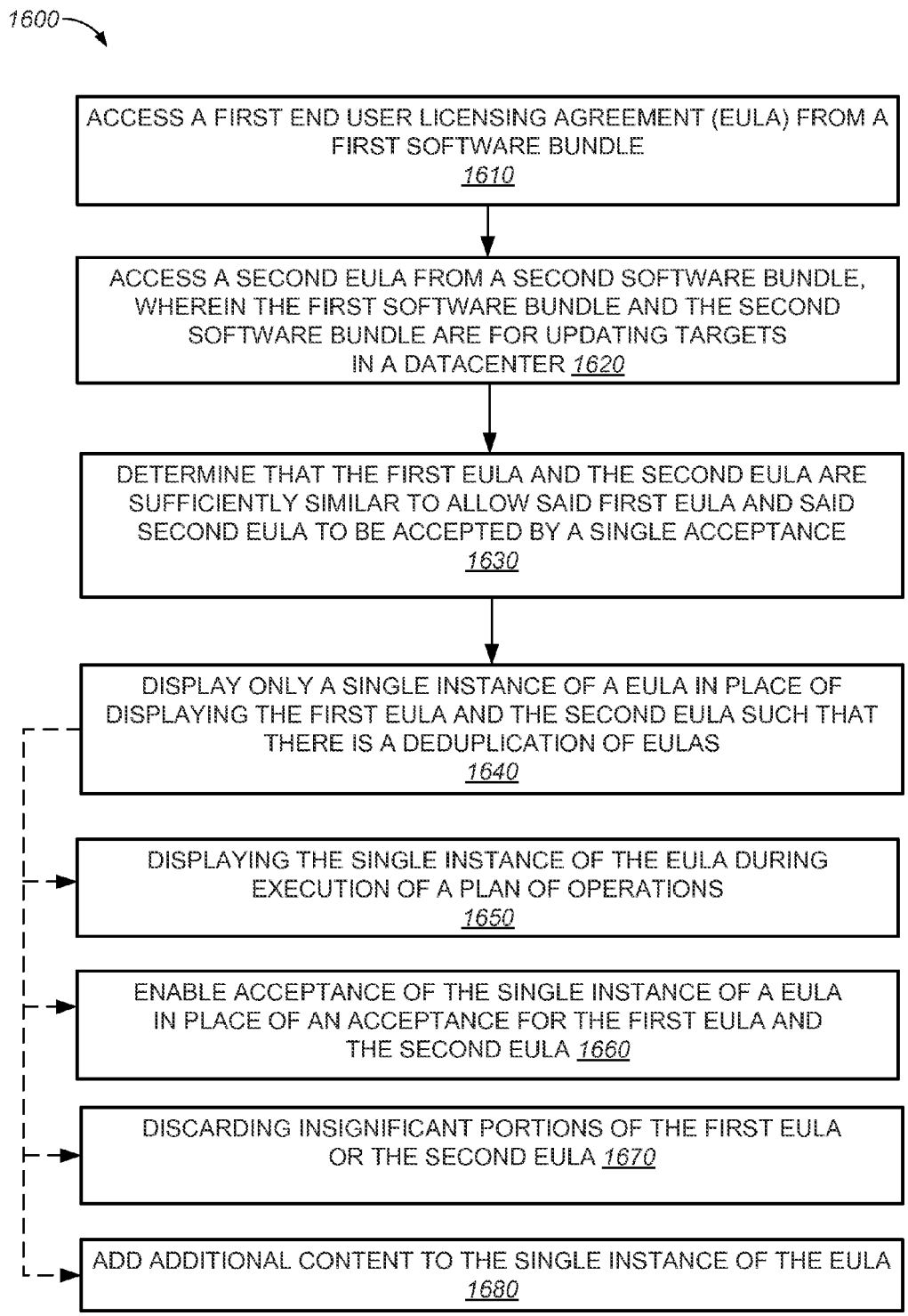
FIG. 16 depicts a flow diagram for a method for deduplication of EULAs, according to various embodiments.

The following discussion sets forth in detail the operation of some example methods of operation of embodiments. With reference to FIGS. 15 and 16, flow diagrams 1500 and 1600 illustrate example procedures used by various embodiments. Flow diagrams 1500 and 1600 include some procedures that, in various embodiments, are carried out by a processor under the control of computer-readable and computer-executable instructions. In this fashion, procedures described herein and in conjunction with flow diagrams 1500 and 1600 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., system 100 and/or system 150). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1500 and 1600 such procedures are examples. That is, embodiments are well suited to performing various other procedures or variations of the procedures recited in flow diagrams 1500 and 1600. Likewise, in some embodiments, the procedures in flow diagrams 1500 and 1600 may be performed in an order different than presented and/or not all of the procedures described in one or more of these flow diagrams may be performed. It is further appreciated that procedures described in flow diagrams 1500 and 1600 may be implemented in hardware, or a combination of hardware with firmware and/or software (e.g., software management module 130).

FIG. 15 depicts a process flow diagram 1500 for deduplication of EULAs, according to various embodiments.

At 1510 of flow diagram 1500, access an end user licensing agreement (EULA) from a software bundle. For example, software bundle 1420 is selected for updating various targets in the datacenter. Accordingly, EULA deduplication module 138 accesses EULA 1422 from software bundle 1420.

At 1520, display only a single instance of the EULA such that there is a deduplication of plurality of instances of EULAs. For example, EULA 1422 is displayed only as a single instance of unified EULA 1410 such that EULA 1422 is not displayed and accepted numerous times for each upgraded target.

At 1530, display the single instance of the EULA during execution of a plan of operations. In one embodiment, EULA 1422 is displayed during execution of the plan of operations (e.g., plan 600).

At 1540, receiving an acceptance of the single instance of a EULA in place of an acceptance for each of the plurality of EULAs. For example, when a user accepts unified EULA 1410, the single acceptance by the user takes the place of the user accepting EULA 1422 for each instance that a target is upgraded by software bundle 1420.

At 1550, add additional content to the single instance of the EULA. For example, in one embodiment, additional legal information describing the deduplication of EULAs is displayed in unified EULA 1410.

It is noted that any of the procedures, stated above, regarding flow diagram 1500 may be implemented in hardware, or a combination of hardware with firmware and/or software. For example, any of the procedures are implemented by a processor(s) of a cloud environment and/or a computing environment.

FIG. 16 depicts a process flow diagram 1600 for deduplication of EULAs, according to various embodiments.

At 1610 of flow diagram 1600, access a first end user licensing agreement (EULA) from a first software bundle. For example, software bundle 1420 is selected for updating various targets in the datacenter. Accordingly, EULA deduplication module 138 accesses EULA 1422 from software bundle 1420.

As a result, in one embodiment, EULA accessor 144 accesses the EULA from a software bundle.

At 1620, access a second EULA from a second software bundle, wherein said first software bundle and said second software bundle are for updating targets in a datacenter. For example, software bundle 1430 is also selected for updating various targets in the datacenter. Accordingly, EULA deduplication module 138 accesses EULA 1432 from software bundle 1430.

As a result, in one embodiment, EULA accessor 144 accesses the EULA from another software bundle.

At 1630, determine that the first EULA and the second EULA are sufficiently similar to allow the first EULA and the second EULA to be accepted by a single acceptance. For example, EULA deduplication module 138 performs a matching algorithm to determine whether or not EULA 1422 and EULA 1432 are sufficiently similar such that they may be displayed as a single instance as unified EULA 1410.

As a result, in one embodiment, EULA comparator 145 compares (e.g. using a checksum) whether the first EULA and the second EULA are sufficiently similar to allow the first EULA and the second EULA to be accepted by a single acceptance.

At 1640, display only a single instance of a EULA in place of displaying said first EULA and said second EULA such that there is a deduplication of EULAs. For example, unified EULA 1410 is displayed only a single time and requiring only a single acceptance rather than EULA 1422 or EULA 1432 being displayed for acceptance for each instance that software bundles 1420 and 1430 are utilized for upgrading targets.

As a result, in one embodiment, EULA displayer 146 displays only a single instance of a EULA in place of displaying the first EULA and the second EULA such that there is a deduplication of EULAs.

At 1650, displaying the single instance of said EULA during execution of a plan of operations. In one embodiment, unified EULA 1419 is displayed during execution of the plan of operations (e.g., plan 600).

At 1660, enable acceptance of the single instance of a EULA in place of an acceptance for the first EULA and the second EULA. For example, unified EULA 1410 is displayed such that it requires only a single acceptance by a user rather than EULA 1422 or EULA 1432 being displayed for the user accepting each instance that software bundles 1420 and 1430 are utilized for upgrading targets.

At 1670, discarding insignificant portions of the first EULA or the second EULA. For example, EULA 1422 and EULA 1432 may be deemed to be matching. However, various portions of EULA 1422 and EULA 1432 may be insignificant are not displayed in unified EULA 1410.

At 1680, add additional content to the single instance of the EULA. For example, in one embodiment, additional legal information describing the deduplication of EULAs is displayed in unified EULA 1410.

It is noted that any of the procedures, stated above, regarding flow diagram 1600 may be implemented in hardware, or a combination of hardware with firmware and/or software. For example, any of the procedures are implemented by a processor(s) of a cloud environment and/or a computing environment.

Example Host Computer System

Figure 17:
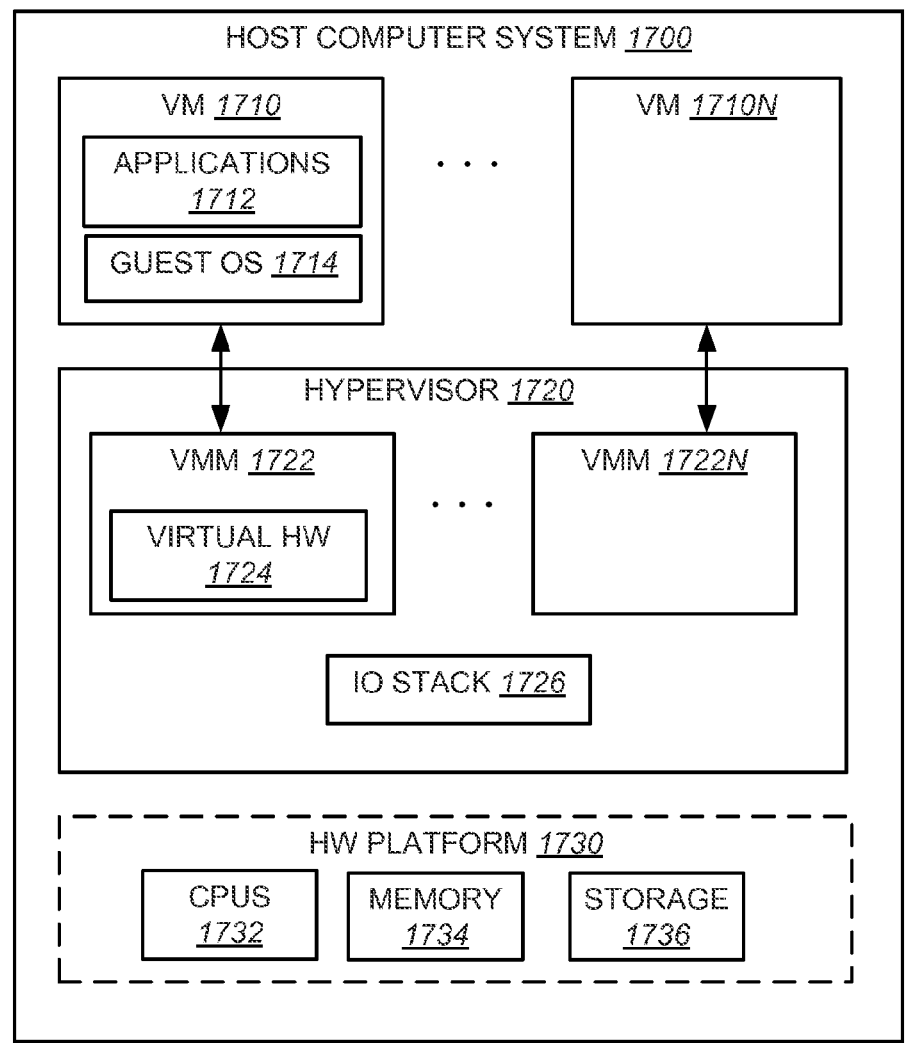
FIG. 17 depicts a block diagram of a host system, accordingly to various embodiments.

FIG. 17 is a schematic diagram that illustrates a virtualized computer system that is configured to carry out one or more embodiments of the present invention. The virtualized computer system is implemented in a host computer system 1700 including hardware platform 1730. In one embodiment, host computer system 1700 is constructed on a conventional, typically server-class, hardware platform.

Hardware platform 1730 includes one or more central processing units (CPUs) 1732, system memory 1734, and storage 1736. Hardware platform 1730 may also include one or more network interface controllers (NICs) that connect host computer system 1700 to a network, and one or more host bus adapters (HBAs) that connect host computer system 1700 to a persistent storage unit.

Hypervisor 1720 is installed on top of hardware platform 1730 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 1724 for virtual machine 1710 supports the installation of guest OS 1714 which is capable of executing applications 1712 within virtual machine 1710.

Guest OS 1714 may be any of the well-known commodity operating systems, and includes a native file system layer, for example, either an NTFS or an ext3FS type file system layer. IOs issued by guest OS 1714 through the native file system layer appear to guest OS 1714 as being routed to one or more virtual disks provisioned for virtual machine 1710 for final execution, but such IOs are, in reality, are reprocessed by IO stack 1726 of hypervisor 1720 and the reprocessed IOs are issued, for example, through an HBA to a storage system.

Virtual machine monitor (VMM) 1722 and 1722*n* may be considered separate virtualization components between the virtual machines and hypervisor 1720 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method for a unified graphical user interface for displaying a plan of operations in a datacenter, comprising:
   accessing metadata from a plurality of disparate software bundles for updating targets in a datacenter;
   displaying a unified visualization of a plan of operations on said targets via a unified graphical user interface based on said accessed metadata,
   wherein said unified graphical user interface displays said plan of operations with a common look and feel on a display screen; and
   displaying a unified visualization of an execution of said plan of operations via said unified graphical user interface based on said accessed metadata,
   wherein said unified graphical user interface displays said execution of said plan of operations with the common look and feel.

2. The computer-implemented method of claim 1, further comprising:
   automatically determining dependency relationships between said target and other targets.

3. The computer-implemented method of claim 2, wherein said dependency relationships are determined automatically.

4. The computer-implemented method of claim 2, wherein said dependency relationships comprise conflicts between said targets.

5. The computer-implemented method of claim 1, further comprising:
   enabling user interaction with said plan of operations via said unified graphical user interface.

6. The computer-implemented method of claim 1, further comprising:
   displaying a sequence of steps of said plan.

7. The computer-implemented method of claim 1, wherein said targets are selected from a group consisting of: a host system, a physical device, virtual machine, and firmware.

8. The computer-implemented method of claim 1, wherein at least two of said disparate software bundles are provided by different vendors.

9. A non-transitory computer-readable storage medium having instructions embodied therein that when executed cause a computer system to perform a method for a unified graphical user interface for displaying a plan of operations in a datacenter, said method comprising:

accessing metadata from a plurality of disparate software bundles for updating targets in a datacenter, wherein said metadata is accessed in response to user selection of said plurality of disparate software bundles;

displaying a unified visualization of a plan of operations on said targets via a unified graphical user interface based on said accessed metadata, wherein said unified graphical user interface displays said plan of operations with a common look and feel; and displaying a unified visualization of an execution of said plan of operations via said unified graphical user interface based on said accessed metadata, wherein said unified graphical user interface displays said execution of said plan of operations with the common look and feel.

10. The non-transitory computer-readable storage medium of claim 9, further comprising:

automatically determining dependency relationships associated with said targets.

11. The non-transitory computer-readable storage medium of claim 10, wherein said dependency relationships comprise conflicts between targets.

12. The non-transitory computer-readable storage medium of claim 9, further comprising:

enabling user interaction with said plan of operations via said unified graphical user interface.

13. The non-transitory computer-readable storage medium of claim 9, further comprising:

enabling user interaction with said plan of operations via said unified graphical user interface during execution of said plan of operations.

14. The non-transitory computer-readable storage medium of claim 9, further comprising:

displaying a sequence of steps of said plan.

15. The non-transitory computer-readable storage medium of claim 9, wherein said targets are selected from a group consisting of: a host system, a physical device, virtual machine, and firmware.

16. The non-transitory computer-readable storage medium of claim 9, wherein at least two of said disparate software bundles are provided by different vendors.

17. The non-transitory computer-readable storage medium of claim 9, further comprising:

executing said plan of operations.

18. A system for implementing a unified graphical user interface for displaying a plan of operations in a datacenter, said system comprising:

a metadata accessor to accesses metadata from a plurality of disparate software bundles for updating targets in a datacenter, wherein said metadata is accessed in response to user selection of said plurality of disparate software bundles; and a plan displayer to display a unified visualization of a plan of operations on said targets via a unified graphical user interface based on said accessed metadata, wherein said unified graphical user interface displays said plan of operations with a common look and feel on a display screen, said plan displayer to display a unified visualization of an execution of said plan of operations via said unified graphical user interface based on said accessed metadata, wherein said unified graphical user interface displays said execution of said plan of operations with the common look and feel.

* * * * *